United States Patent [19]

Dixon

[11] 4,002,265

[45] Jan. 11, 1977

[54] APPARATUS FOR PNEUMATICALLY DELIVERING PARTS

[75] Inventor: Paul H. Dixon, Belvidere, Ill.

[73] Assignee: Babette Dixson, Trustee of Paul H. Dixson, Trust dated Jan. 28, 1975, Belvidere, Ill.

[22] Filed: June 6, 1975

[21] Appl. No.: 584,479

Related U.S. Application Data

[62] Division of Ser. No. 517,920, Oct. 25, 1974, Pat. No. 3,929,176.

[52] U.S. Cl. ............................... 221/210; 221/225; 221/278; 302/2 R; 214/1 BB; 214/1 BE

[51] Int. Cl.² ......................................... B65G 51/02

[58] Field of Search .......... 221/210, 211, 220, 224, 221/225, 259, 260, 278; 302/2 R; 214/1 BB, 1 BE

[56] References Cited

UNITED STATES PATENTS

| | | | |
|---|---|---|---|
| 2,059,546 | 11/1936 | Braudenburg | 221/220 |
| 2,544,165 | 3/1951 | Krasnow | 221/299 X |
| 2,785,400 | 3/1957 | McIlvin et al. | 221/278 X |
| 3,757,995 | 9/1973 | Armstrong | 221/211 |

*Primary Examiner*—Robert B. Reeves
*Assistant Examiner*—Joseph J. Rolla
*Attorney, Agent, or Firm*—Leydig, Voit, Osann, Mayer & Holt, Ltd.

[57] ABSTRACT

A screw is blown through a flexible tube and into the jaws of a transfer mechanism which is associated with a hand-held screw driving gun. Thereafter, the jaws are advanced to deliver the screw into telescoping relation with a retractible tubular finder which surrounds the driving bit of the gun, the jaws holding the screw during initial driving of the screw and then returning to receive another screw from the tube. The machine includes a unique transfer system for (a) placing the screw into and blowing the screw through the tube, (b) advancing and returning the jaws along different paths to enable the jaws to place the screw in the finder while holding and maintaining control over the screw during initial driving, (c) momentarily retracting the finder during advance of the jaws to enable the screw to be telescoped with the finder, (d) automatically controlling the advance and return of the jaws in response to extension and retraction of the finder, and (e) controlling opening and closing of the jaws to enable the jaws to tightly grip the screw during its delivery while still holding the screw during initial driving.

4 Claims, 26 Drawing Figures

Fig. 2.
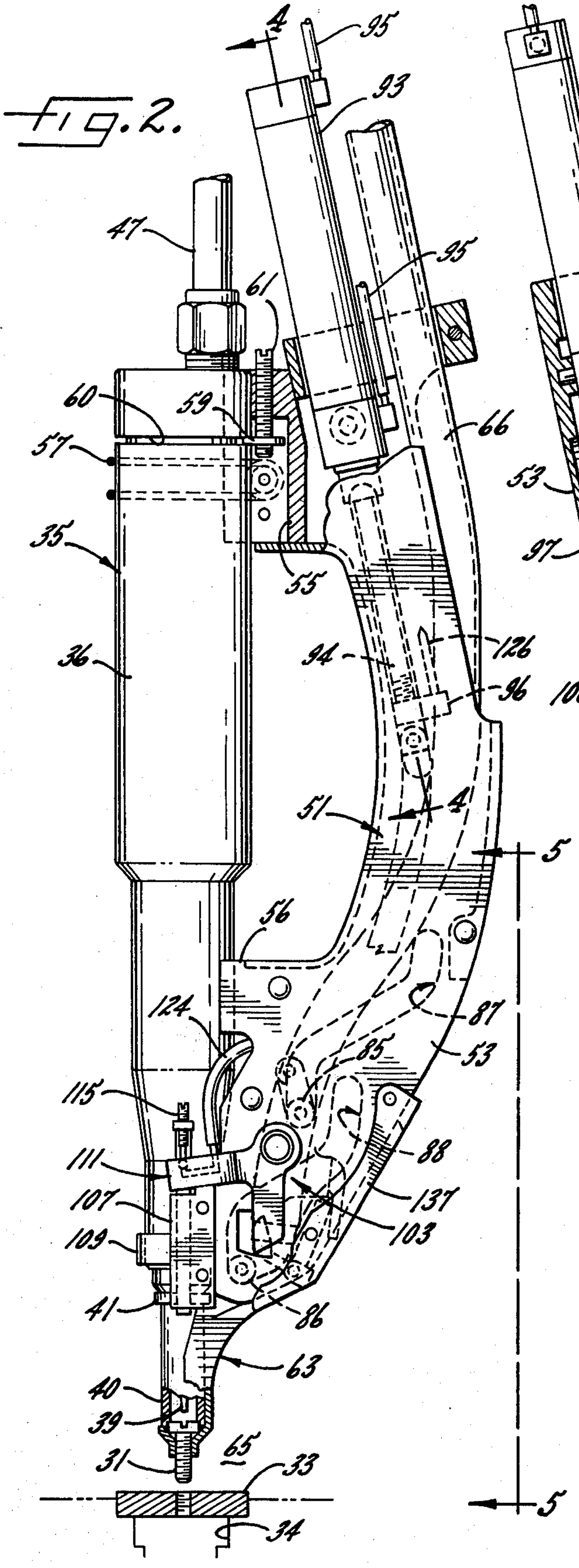
Fig. 4.
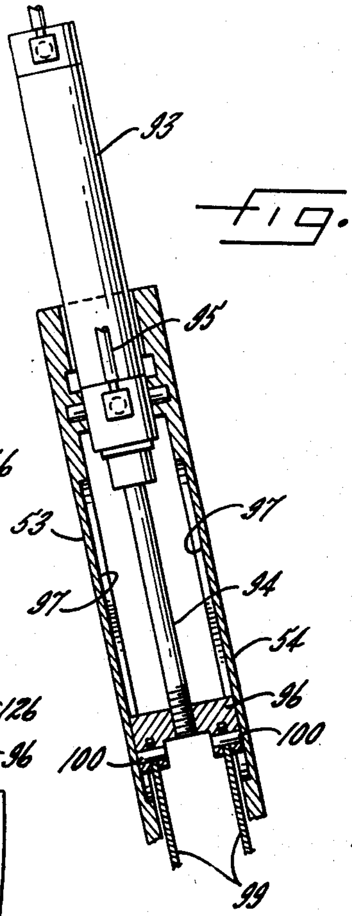
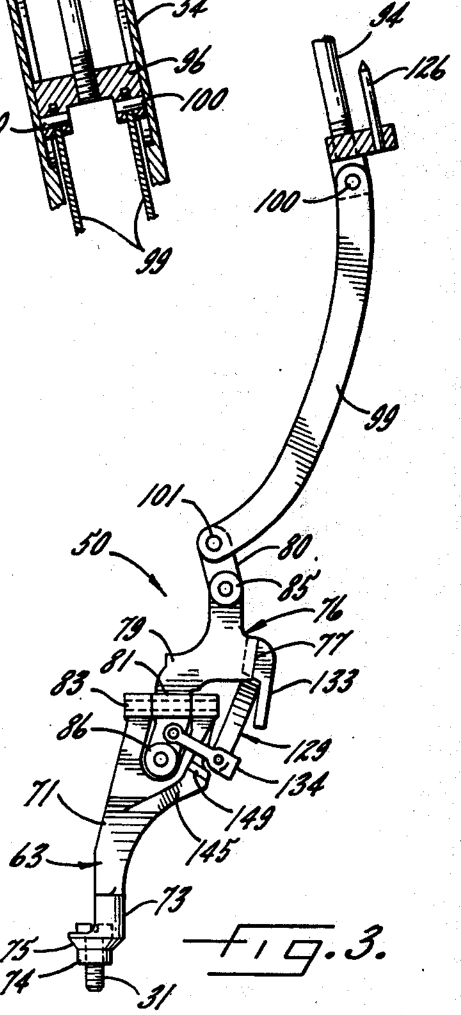
Fig. 3.

FIG. 24.
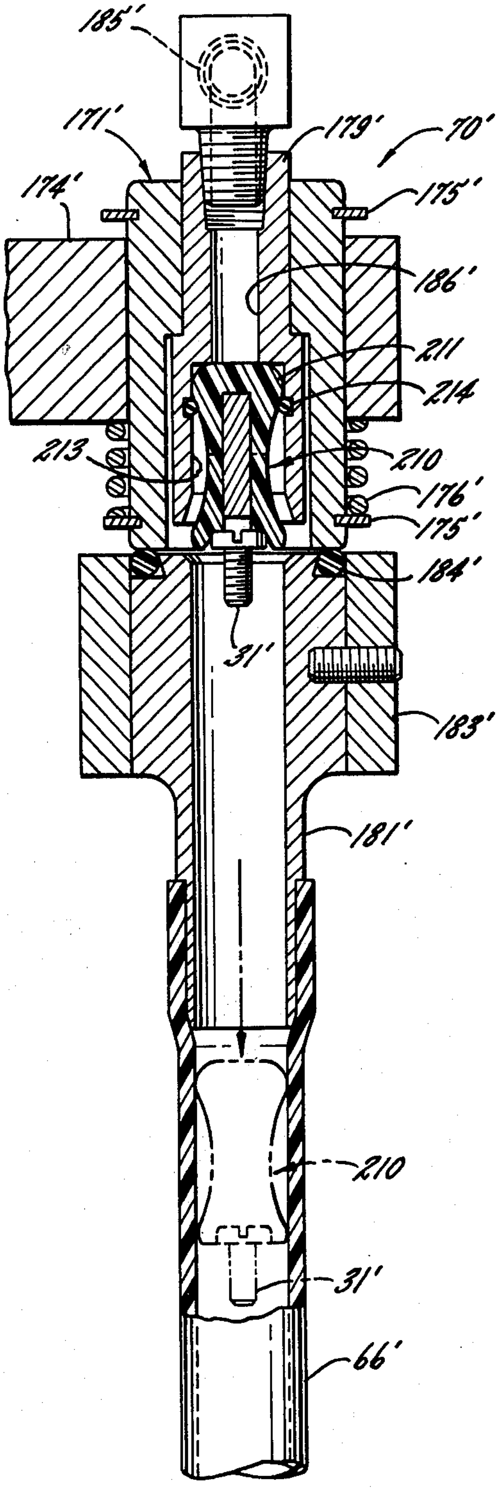
FIG. 25.
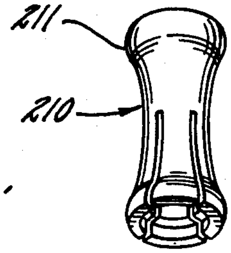
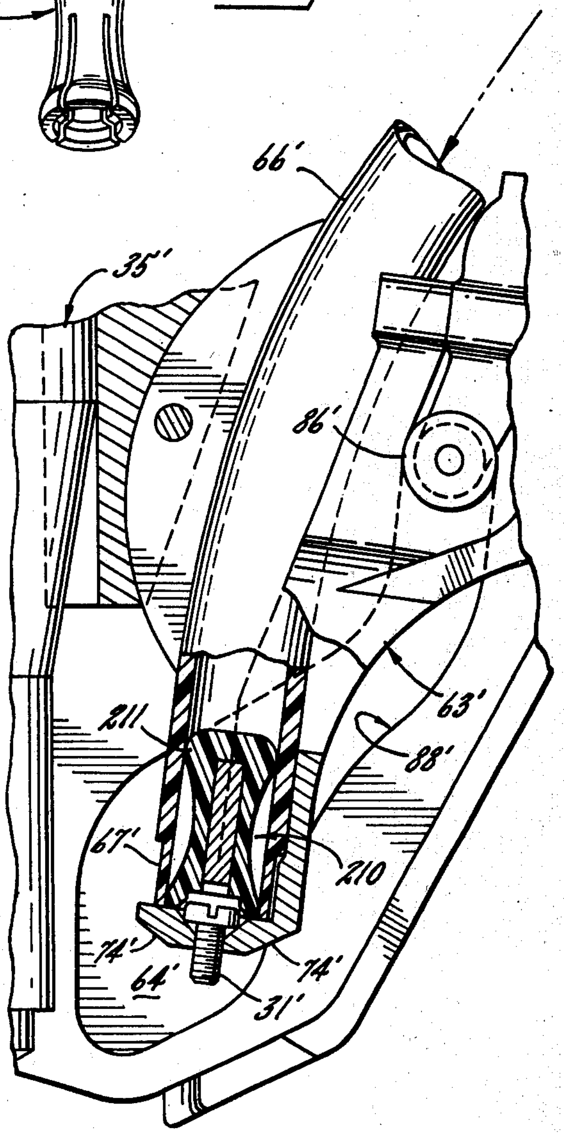
FIG. 26.

APPARATUS FOR PNEUMATICALLY DELIVERING PARTS

This is a division, of application Ser. No. 517,920, filed Oct. 25, 1974, now U.S. Pat. No. 3,929,176.

BACKGROUND OF THE INVENTION

This invention relates generally to a machine for automatically driving threaded fasteners such as screws into a workpiece. More particularly, the invention relates to a machine of the type which includes a driving gun with a power-rotated screwdriver, a finder associated with the driver, and mechanism for transferring screws one at a time from a pick-up station to a delivery station where the screw is placed in the finder preparatory to being driven. The finder of such a machine keeps the screw in alinement with the driver and enables the driver to move into driving engagement with the head of the screw.

Automatic machines of the foregoing type are disclosed in my U.S. Pat. Nos. 3,279,045 and 3,675,302. In these machines, the driving gun is mounted on a supporting bracket and is automatically reciprocated toward and away from the workpiece to effect driving of the screws. In another type of automatic machine, the driving gun is held in the hand of the operator and is manually moved toward and away from the workpiece in order to drive the screw. A very widely used hand-held gun is of the semi-automatic type in which the screws are not fed automatically to the finder but instead are manually started into the workpiece and then are driven home by the power-rotated driver. Such a gun includes a comparatively simple tubular finder which is telescoped over the driver and which is urged to and normally disposed in an extended position so as to telescope over the head of the screw. During driving of the screw, the screw head presses against the finder and moves the latter to a retracted position along the driver. When the driver is released from the driven screw, the finder automatically returns to its extended position preparatory to telescoping over the next screw.

SUMMARY OF THE INVENTION

One of the aims of the present invention is to provide a new and improved automatic fastener driving machine which is particularly adapted for hand-held operation and which is simpler in construction and more trouble-free in operation than prior automatic hand-held machines.

Another object is to provide an automatic machine having a hand-held gun which is adapted to drive relatively short screws at comparatively high speeds.

An important object is to provide an automatic fastener driving machine which may utilize the relatively inexpensive semiautomatic driving gun that is presently available, the machine being capable of delivering each screw rapidly to and holding the screw precisely in the comparatively simple tubular finder of such a gun and being capable of driving the screw after the finder has been retracted through only a very short stroke.

A more detailed object of the invention is to provide an automatic fastener driving machine in which the normal retractextend motion of the finder is used to control the movement of the mechanism for transferring the screws from the pick-up station to the finder.

Another object is to utilize the motion of the transfer mechanism to first retract the finder and enable the screw being delivered to be placed in line with the finder, and then to re-extend the finder into telescoping relation with the newly delivered screw.

The invention further resides in the novel construction, mounting and movement of the transfer mechanism to enable the mechanism to place the screw in line with the finder, to hold the screw in a stable position in the finder during initial driving of the screw, and then to retract clear of the finder and the screw before obstructing further driving of the screw.

Still another object is to provide a novel transfer mechanism having a pair of opposed jaws which are uniquely controlled to tightly grip, loosely hold and then completely release the screw at appropriate times during the machine cycle.

Another object of the invention is to provide a unique unit for receiving the screws from a remote supply and for delivering the screws rapidly to the pick-up station adjacent the driving gun, such delivery being effected by blowing the screws through a flexible tube which extends between the unit and the gun.

A related object is to blow the screws through the delivery tube while keeping the screws properly oriented even though the screws may be of such small size as to tumble within the tube.

The invention also resides in the provision of a novel shuttling cartridge which is adapted to carry a small screw through the tube to keep the screw properly oriented, the cartridge discharging the screw at the pick-up station and then traveling reversely through the tube to receive the next screw from the main supply.

These and other objects and advantages of the invention will become more apparent from the following detailed description when taken in conjunction with the accompanying drawings.

BRIEF DESCRIPTION OF THE DRAWINGS

FIG. 2 is a fragmentary side elevation of the driving gun and parts of the transfer mechanism and showing the gun and the transfer mechanism as positioned preparatory to the start of a cycle.

FIG. 3 is a side elevation of parts of the transfer mechanism.

FIG. 4 is a fragmentary cross-section taken substantially along the line 4—4 of FIG. 2.

FIG. 24 is a view generally similar to FIG. 23 but illustrates a modified feeding and delivery unit in which the screw is carried through the tube by a cartridge.

FIG. 25 is a perspective view of the cartridge.

FIG. 26 is a view which shows the cartridge and the screw arriving at the pick-up station for delivery of the screw into the jaws of the transfer mechanism.

GENERAL ORGANIZATION OF THE MACHINE

Figure 1:
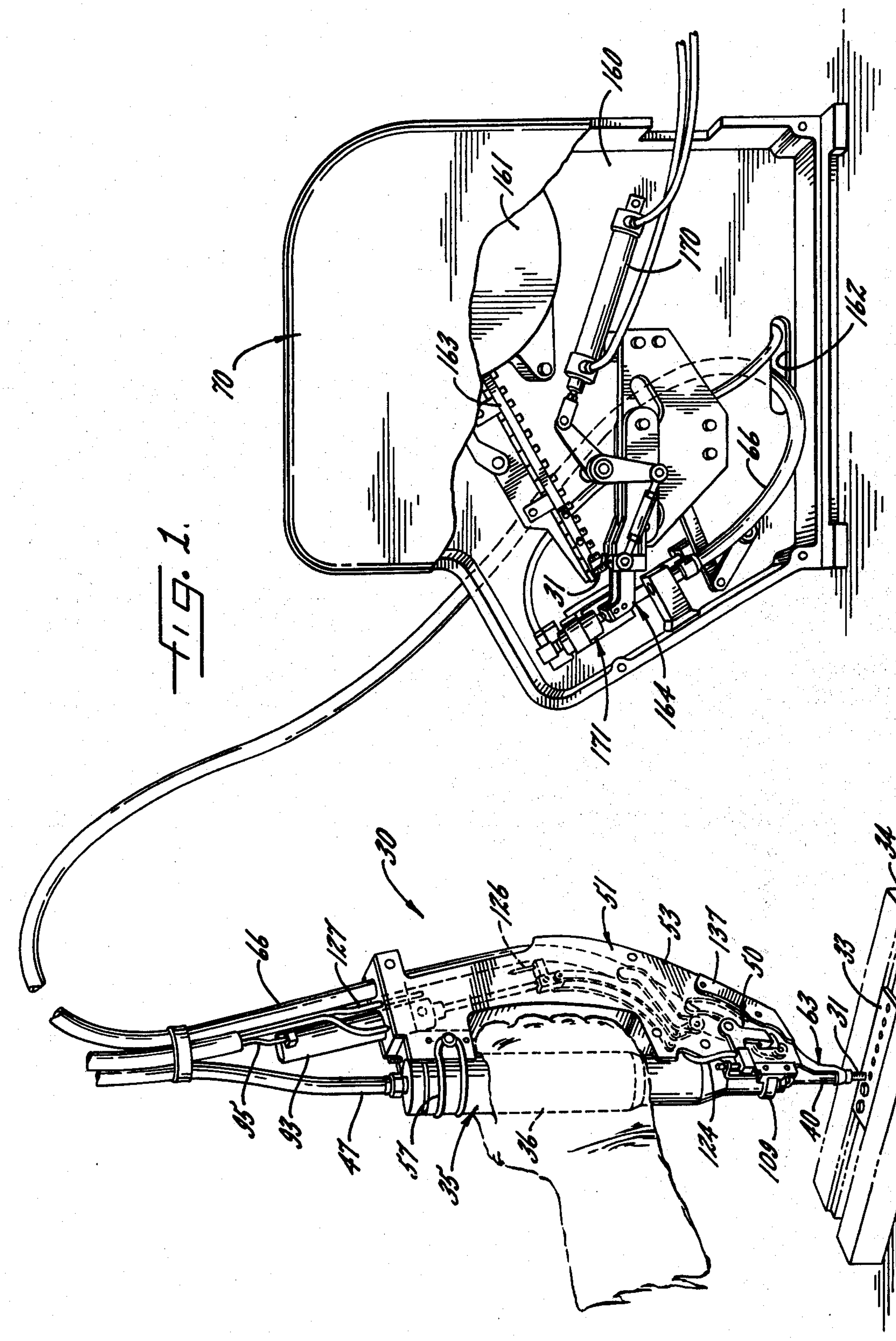
FIG. 1 is a perspective view of a new and improved automatic fastener driving machine incorporating the unique features of the present invention.

As shown in the drawings for purposes of illustration, the invention is embodied in a machine 30 for automatically driving threaded fasteners such as screws 31 into holes in a workpiece 33 which herein is held in a horizontal plane by a suitable fixture 34. The machine includes a driving gun 35 which, in this instance, may be held in the hand of the machine operator and maneuvered to any selected position over the workpiece, the gun being manually moved downwardly to drive the screw and then returned upwardly out of engagement with the screw. If the workpiece is disposed in other than a horizontal plane, the operator may turn the gun at right angles to the workpiece and then drive the screws by moving the gun toward and away from the workpiece. It should be recognized, however, that certain principles of the invention are applicable to a machine having a driving gun mounted on a supporting bracket and adapted to be reciprocated automatically by a power actuator. Machines of this type are disclosed in my aforementioned patents.

The driving gun 35 of the machine 30 is one of those popular guns which are presently made available to the market in different models by several manufacturers and which conventionally have been used extensively to drive screws in a semi-automatic operation. That is, guns similar to the gun 35 have been widely used to drive the screws home after the operator has first started the screws into the workpiece with his fingers. In general, the gun 35 is of the so-called push-to-start type and includes an elongated barrel 36 which houses a rotary air motor (not shown) adapted to rotate a driver such as a screwdriver bit 38 (FIGS. 6 and 7) having a flat blade 39 sized to fit into the slotted heads of the screws 31. The bit is telescoped into and projects downwardly out of the barrel 36 and its lower end portion is telescoped into a tubular sleeve of finder 40 which holds the head of the screw in alinement with the blade while the blade seeks and moves into driving engagement with the screw head.

Figure 7:
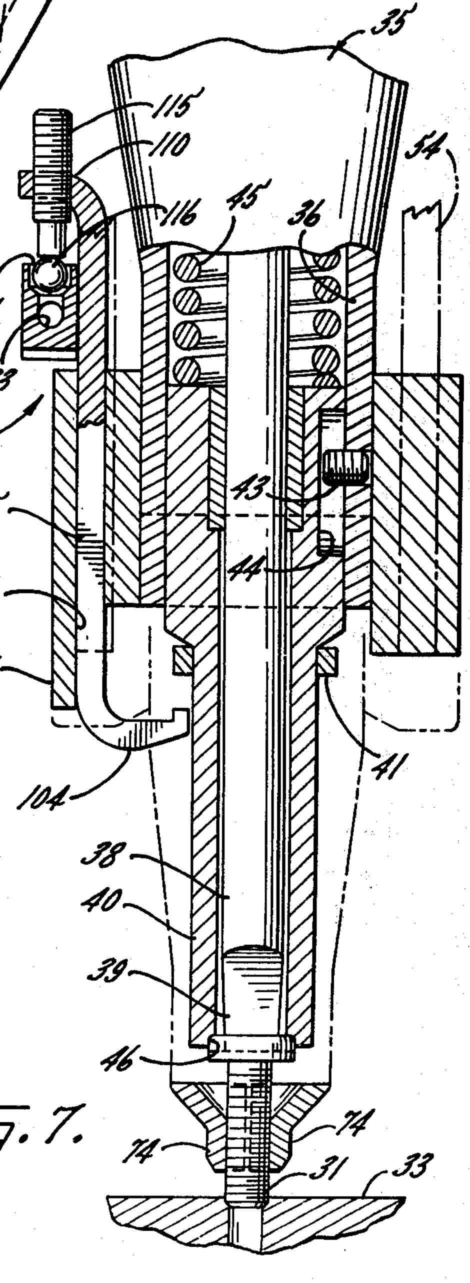
FIG. 7 is a fragmentary cross-section taken substantially along the line 7—7 of FIG. 6.

Except for the provision of a ring 41 (FIG. 7) whose purpose will be explained subsequently, the finder 40 is identical to the finders presently being used on conventional semi-automatic guns. As shown in FIG. 7, the finder is telescoped slidably into the lower end portion of the barrel 36 and over the lower end portion of the driver bit 38 and is keyed against rotation by a set screw 43 threaded into the barrel and extending into a slot 44 in the upper end portion of the finder. A coil spring 45 is telescoped into the barrel and is compressed against the upper end of the finder so as to urge the finder downwardly to a normal extended position (see FIG. 2) relative to the blade 39 of the bit 38. When the finder is in its extended position, its lower end portion projects downwardly beyond the blade and is adapted to telescope over the head of the screw 31 to hold the screw in a driving position in line with the bit. The lower end of the finder is formed with a counterbore 46 (FIG. 7) whose side wall closely encircles the screw head and whose top wall or "roof" defines a downwardly facing shoulder adapted to seat against the upper side of the screw head. Accordingly, the counterbore captivates the screw head against radial and upward movement relative to the finder and helps keep the head in axial alinement with the bit 38 so that the blade 39 may telescope into the slot in the head.

Driving of the screw 31 is effected by moving the gun 35 downwardly while the screw head is telescoped into the counterbore 46 of the finder 40. When the screw is first pressed against and stopped by the workpiece 33, the screw head bears against the roof of the counterbore and momentarily stops downward movement of the finder. With continued downward movement of the gun, the barrel 36 and the driver bit 38 move downwardly relative to the stopped finder and thus the latter assumes an upwardly retracted position (FIG. 6) with respect to the bit and exposes the end of the blade 39. As the finder approaches its retracted position, the blade contacts the screw head and results in the application of upward pressure on the bit 38. Such pressure causes opening of an air valve (not shown) to effect the delivery of pressurized air to the rotary motor of the gun 35 through a line 47 (FIG. 1) leading to the motor. The bit thus begins rotating and moves into driving engagement with the screw so as to thread the latter into the workpiece. During driving of the screw, the barrel 36, the bit 38 and the finder 40 all move downwardly in unison with the screw until the screw is driven to its final home position in the workpiece. The gun 35 then is lifted upwardly away from the screw and, as an incident thereto, the rotary motor is stopped automatically and the finder 40 is returned to its normal extended position (FIG. 2) by the spring 45.

THE INVENTION IN GENERAL

In one of its important aspects, the present invention contemplates the utilization of a conventional driving gun 35 of the above character in a machine 30 having a relatively simple and compact transfer mechanism 50 (FIG. 3) which not only delivers the screws 31 automatically into the tubular finder 40 but which also holds each screw telescoped within the finder and in alinement with the bit 38 during initial threading of the screw into the workpiece 33. As a result of the unique delivery and holding action of the transfer mechanism, the screws may be automatically placed in the conventional but difficult-to-load finder 40 and are maintained under extremely stable control during the critical period of initial threading.

THE TRANSFER MECHANISM

More specifically, the transfer mechanism 50 is mounted within a main support or housing 51 which herein is defined in part by a pair of vertically extending and horizontally spaced side plates 53 and 54 located at the rear side of the gun 35. Cradles 55 and 56 (FIG. 2) on the front of the housing 51 serve to support the upper portion and mid-portion, respectively, of the gun barrel 36 while the lower portion of the barrel is secured to the housing by means to be described subsequently. An elastic band 57 is stretched around the upper portion of the barrel and is anchored to the upper cradle 55 to press the barrel tightly into the cradle. Axial movement of the barrel is restricted by a washer 59 which is fitted into a circumferentially extending groove 60 in the barrel and which is anchored to a vertically extending screw 61. The latter is threaded into the upper cradle and may be adjusted vertically to bring the washer into alinement with the grooves of different models of semi-automatic guns.

Figure 18:
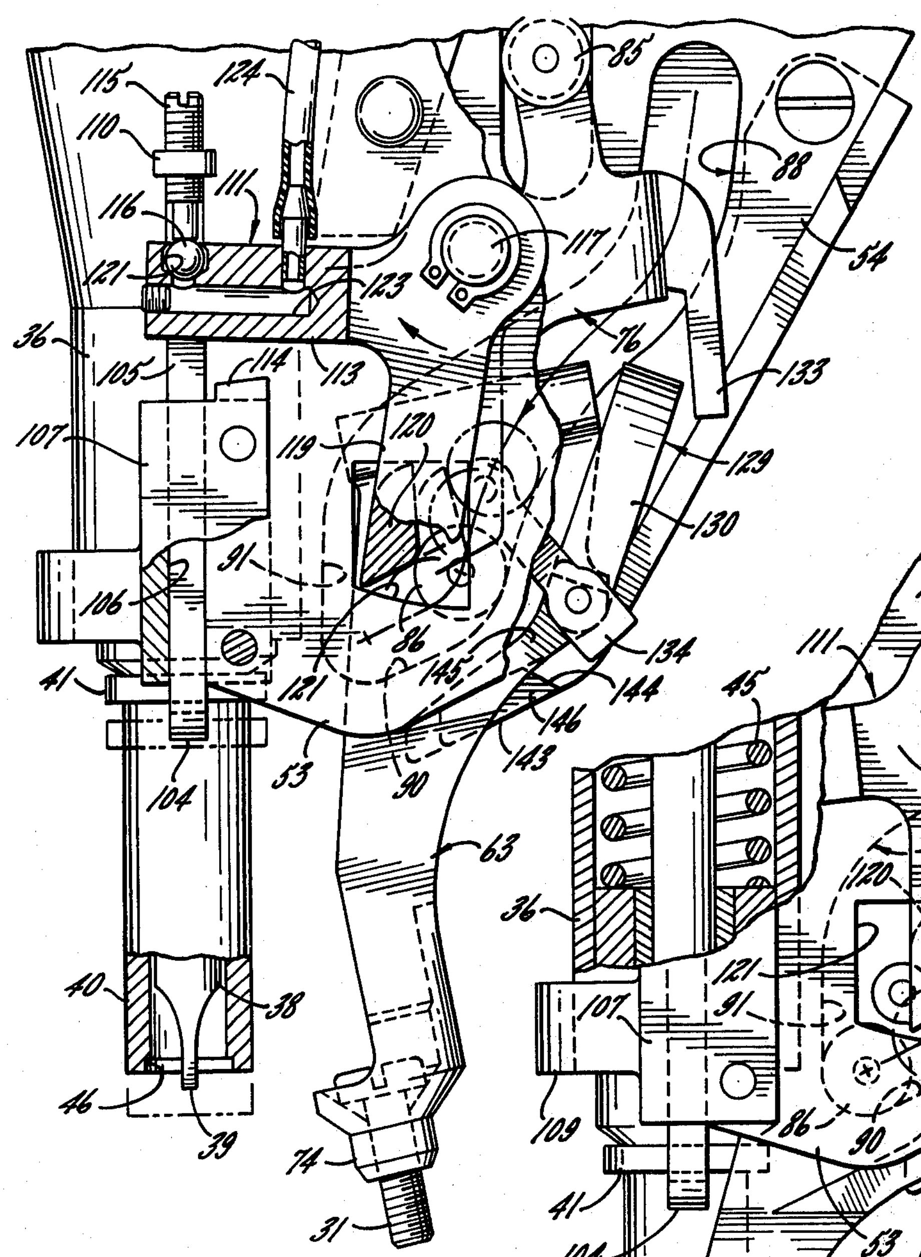
FIGS. 18 and 19 are views generally similar to FIG. 6 but showing successive positions of the parts during the final advance of the new screw from the pick-up station.

The transfer mechanism 50 includes a holder which herein is formed by a pair of opposed jaws 63 adapted to receive a screw 31 at a pick-up station 64 (FIG. 13) and then move downwardly and forwardly to a delivery station 65 (FIGS. 2 and 18) to place the screw in its driving position in telescoping relation with the finder 40. In addition to moving between the pick-up and delivery stations, the jaws are mounted to swing between closed and open positions (FIGS. 14 and 10), in which the jaws hold and release the screw shank. The screw is delivered to the jaws while the jaws are disposed in the pick-up station 64 and are in their closed positions (see FIGS. 13 and 14). For this purpose, a flexible plastic tube 66 extends into the housing 51 and has its lower or delivery end 67 located in the pick-up station 64. Just after the jaws have been returned upwardly and rearwardly to the pick-up station, a screw is blown shank-first through the tube by pressurized air and moves between and is held by the jaws for subsequent transfer to the delivery station 65. Insertion of the screws into and blowing of the screws through the tube is effected by a feeding and delivery unit 70 (FIG. 1 and FIGS. 20 to 23) which will be described subsequently.

Figure 5:
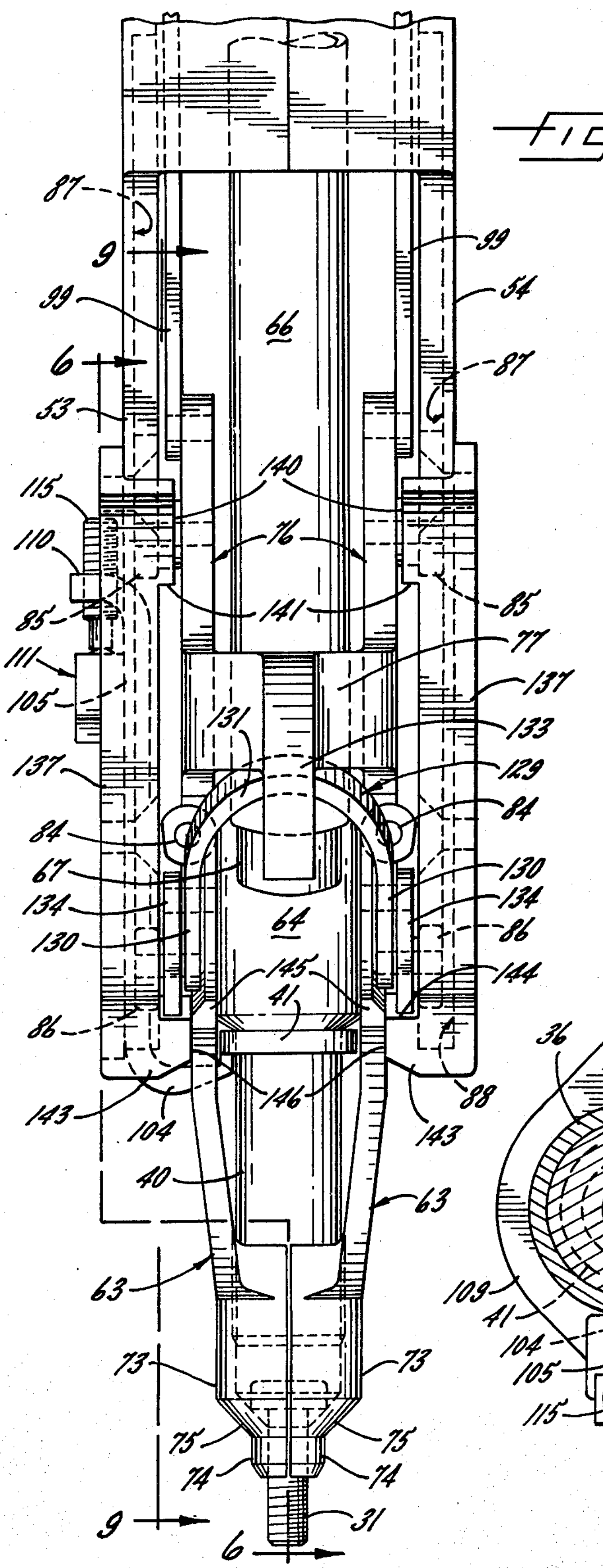
FIG. 5 is an enlarged fragmentary cross-section taken substantially along the line 5—5 of FIG. 2.
Figure 8:
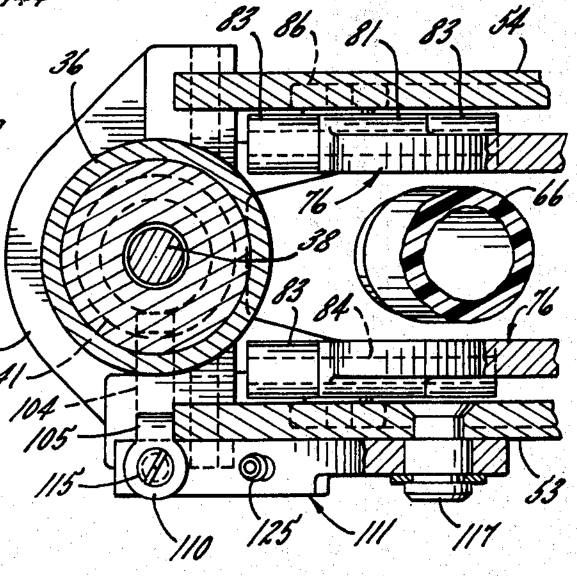
FIG. 8 is a fragmentary cross-section taken substantially along the line 8—8 of FIG. 6.

In this instance, each jaw 63 includes a generally upright arm 71 (FIGS. 9 and 10) whose lower end is formed with an upper quarter-tubular boss 73 and a lower semi-tubular finger 74 of reduced diameter, the boss and the finger being joined by a downwardly tapering half-cone 75. When the jaws are closed and are positioned in the delivery stations 65 as shown in FIG. 5, the bosses 73 loosely embrace the rear side of the finder 40, the screw head rests against the inner surfaces of the half-cones 75, and the fingers 74 encircle and hold the screw shank.

To mount the jaws 63 to move between the pick-up and delivery stations 64 and 65 and also between their open and closed positions, the transfer mechanism 50 includes a movable carriage which is located between the side plates 53 and 54 of the housing 51. Herein, the carriage is of one-piece construction and is formed by two horizontally spaced and vertically extending carrier members 76 (FIGS. 3, 9 and 10) whose rear sides are joined by an integral strap 77. Each carrier member is formed with a downwardly projecting lower leg 79 (FIG. 9) and with an upwardly and outwardly curved upper leg 80. Formed on the upper end portion of the lower leg of each carrier member is a tubular knuckle 81 which is sandwiched between similar knuckles 83 on the upper end of the adjacent jaw 63. A pin 84 is telescoped through each set of alined knuckles and mounts the jaw to swing laterally between its open and closed positions on the associated carrier member.

Figure 9:
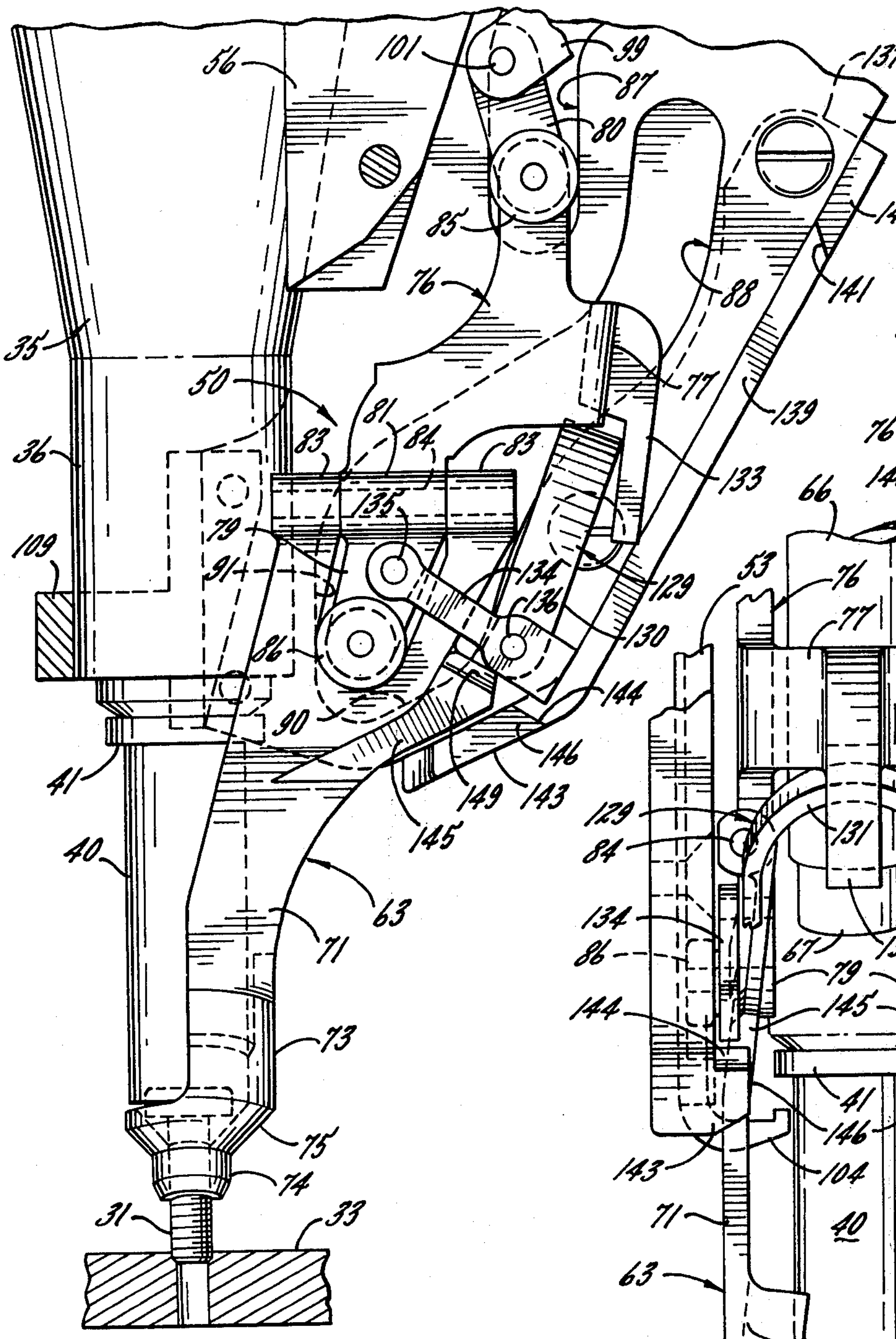
FIG. 9 is a fragmentary cross-section taken along the line 9—9 of FIG. 5 but showing parts in still further moved positions just after initial driving of the screw.
Figure 16:
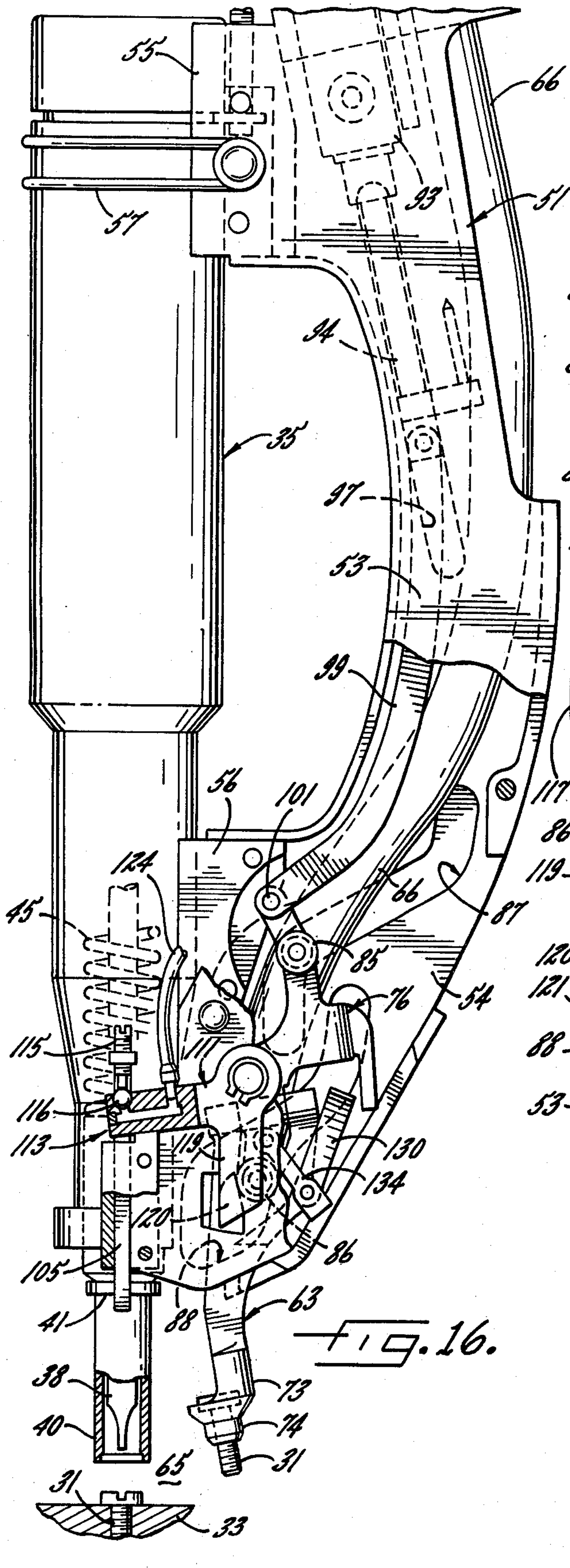
FIG. 16 is a view similar to FIG. 11 but showing the parts during initial advance of the new screw from the pick-up station.
Figure 17:
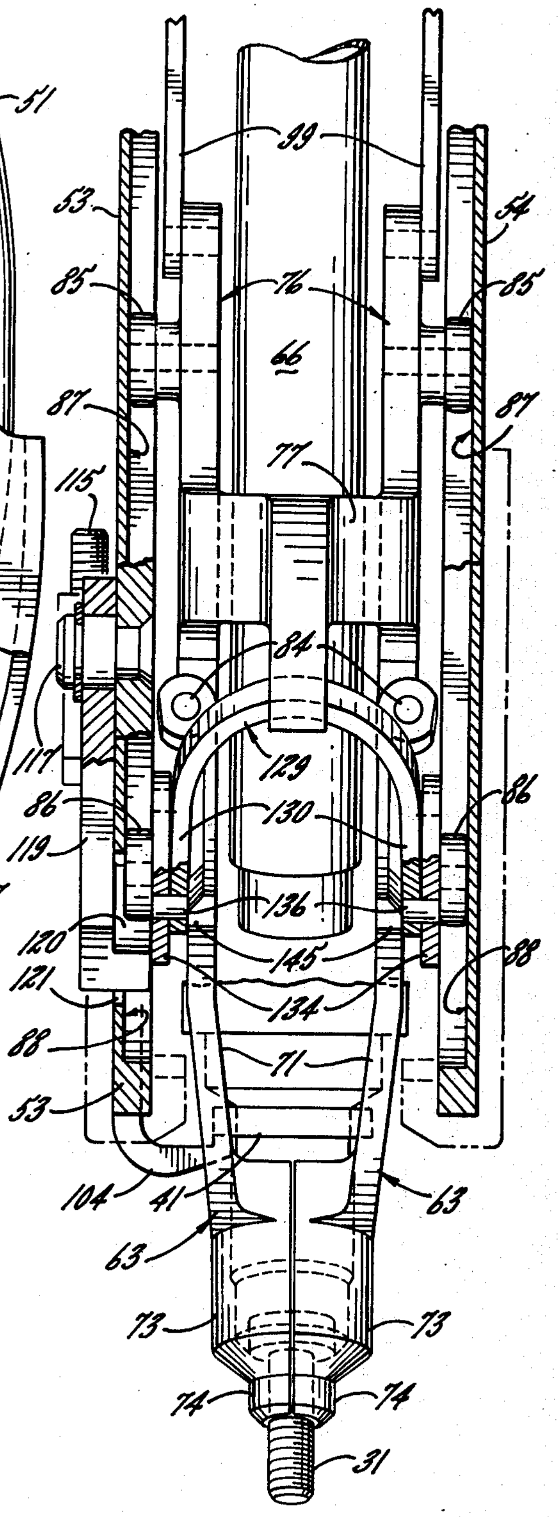
FIG. 17 is an enlarged rear elevation of parts shown in FIG. 16.

As shown in FIGS. 3, 9 and 17, a roller follower 85 is journaled intermediate the ends of the upper leg 80 of each carrier member 76 while a similar follower 86 is journaled at the lower end of each lower leg 79. The upper and lower followers 85 and 86 are adapted to ride within upper and lower cam tracks 87 and 88 (FIGS. 16 and 17), respectively, which are defined by slots formed in the inner sides of the side plates 53 and 54 of the housing 51, the lower set of cam tracks being offset downwardly and forwardly from the upper set. The followers and the tracks coact with one another to guide the carrier members 76 and the jaws 63 as the latter are moved back and forth between the pick-up and delivery stations 64 and 65.

Each of the upper cam tracks 87 extends downwardly, then downwardly and forwardly, and then again downwardly upon progressing from top to bottom. The sides of each upper track parallel one another throughout the length of the track and are spaced apart by a distance corresponding substantially to the diameter of the adjacent upper follower 85. Thus, the upper followers 85 are captivated to travel along the same path as the jaws 63 advance downwardly and forwardly from the pick-up station 64 to the delivery station 65 and as the jaws return upwardly and rearwardly from the delivery station to the pick-up station. The lower cam tracks 88, however, are shaped to cause the lower followers 86 to travel along different paths during the advance and return of the jaws, such different paths being followed for an important purpose to be explained subsequently.

As shown in FIG. 9, each lower cam track 88 includes an upper, downwardly extending portion whose width corresponds generally to the diameter of the associated follower 86 so that the follower will travel along the same path both when moving downwardly and upwardly in the upper portion. Below the upper portion, each lower cam track 88 widens out to a dimension significantly greater than the diameter of the follower 86 and includes a lower edge which extends first downwardly and forwardly at a rather steep slope and then progresses forwardly in a direction extending substantially radially of the finder 40. The radially extending portion of the lower edge of the lower cam track 88 is indicated by the reference numeral 90 in FIGS. 9 and 13 and is located adjacent the lower end of the track. When the jaws 63 are advanced downwardly and forwardly to the delivery station 65, each lower follower 86 rides along the lower edge of the associated lower track 88. During the return of the jaws to the pick-up station 64, each lower follower 86 travels along the upper edge of its lower track 88. Herein, the upper edge includes a vertical portion 91 (FIGS. 9 and 13) which is located adjacent the lower end of the track 88 and which extends axially of the finder 40. The vertical portion 91 merges with a generally upwardly and rearwardly extending portion which, in turn, leads to the upper portion of the track.

In order to move the jaws 63 back and forth between the pick-up and delivery stations 64 and 65, an air cylinder 94 (FIGS. 1, 2 and 4) is secured to the upper end of the housing 51 and includes an elongated rod 94 which is adapted to be reciprocated downwardly and upwardly when pressurized air is admitted into the upper and lower ends of the cylinder through lines 95 (FIG. 2). The lower end of the rod is connected to a block 96 which is guided for up and down movement by slots 97 (FIG. 4) formed in the inner sides of the side plates 53 and 54 of the housing 51. Downwardly and forwardly curved links 99 are pivotally connected at their upper ends to the block as indicated at 100 and are pivotally connected at their lower ends at 101 to the upper ends of the upper legs 80 of the carrier members 76. Thus, downward advance of the rod 94 causes the carrier members 76 and the jaws 63 to move downwardly and forwardly to the delivery station 65 while upward retraction of the rod returns the jaws upwardly and rearwardly to the pick-up station 64. During the advance of the jaws, the rod 94 acts through the curved links 99 and the curved legs 80 of the carrier members 76 to apply to the carrier members a counterclockwise force which tends to rock the carrier members counterclockwise about the upper followers 85 so as to keep the lower followers 86 pressed against the lower edges of the lower cam tracks 88. Conversely, the rod 94 applies a clockwise force to the carrier members as the jaws are returned and thus the jaws are rocked clockwise about the upper followers to cause the lower followers 86 to travel along the upper edges of the lower cam tracks 88.

RETRACTING THE FINDER TO PLACE THE SCREW

The jaws 63 begin moving downwardly and forwardly from the pick-up station 64 with the new screw 31 immediately after the previous screw has been driven and the gun 35 has been lifted upwardly to enable the finder 40 to return to its normal extended position relative to the blade 39. One of the important features of the invention is that movement of the jaws 63 from the pick-up station 64 to the delivery station 65 causes the extended finder 40 to momentarily move upwardly to its retracted position to enable the screw 31 to be moved past the finder and placed in its driving position beneath and in line with the finder. Thereafter, the finder is moved downwardly to its extended position and automatically telescopes downwardly over the head of the newly delivered screw.

Momentary retraction of the finder 40 is effected through the provision of a linkage 103 (FIG. 6) which is connected to the finder 40 and which herein is adapted to be actuated by one of the lower followers 86 as the carrier members 76 shift downwardly and outwardly to move the jaws 63 to the delivery station 65. Part of the linkage 103 is formed by the aforementioned ring 41 on the finder 40, the ring being telescoped over and anchored rigidly to the finder. Underlying the ring is an inwardly projecting horizontal finger 104 (FIGS. 6 and 7) which is formed on the lower end of a vertically extending link or lift bar 105. The latter is guided for free up and down sliding in a hole 106 in a bracket 107 which is anchored to the side plates 53 and 54 of the housing 51 and which includes a semicircular cradle or strap 109 for anchoring the lower end portion of the gun barrel 36 to the housing.

The upper end of the lift bar 105 is formed with an outwardly projecting horizontal finger 110 (FIGS. 6 and 7) which coacts with a member such as a bellcrank lever 111 having a generally horizontal arm 113 disposed in underlying relation with the finger 110 and normally resting against a stop 114 on the upper end of the bracket 107. A connection between the finger 110 and the bellcrank 111 is established by a screw 115 threaded into the finger and bearing against a ball 116 carried by the bellcrank arm 113.

Figure 6:
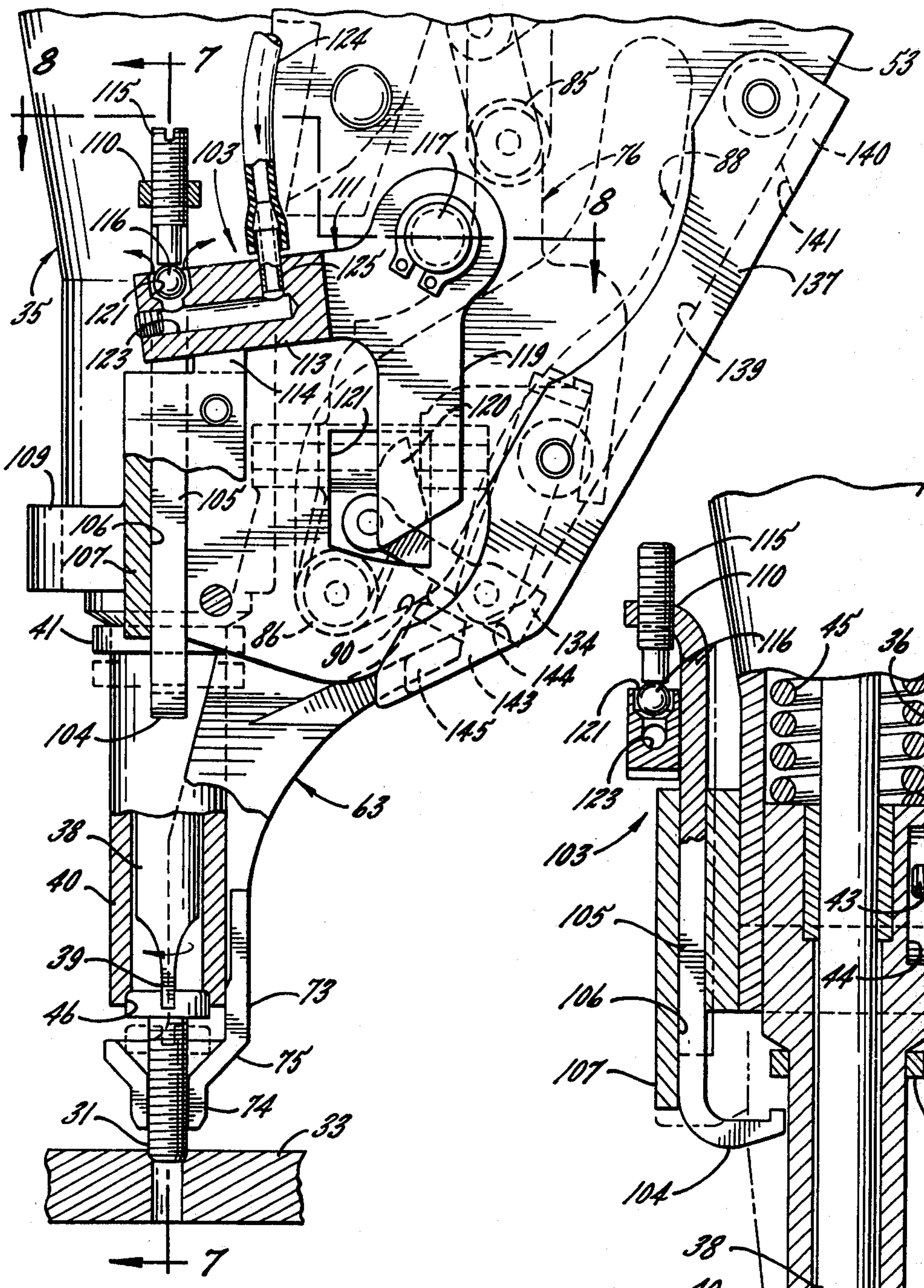
FIG. 6 is a fragmentary cross-section taken substantially along the line 6—6 of FIG. 5 but showing parts as positioned during initial contact of the screw with the workpiece.

As shown in FIG. 6, the bellcrank 113 is located on the outer side of the side plate 53 and is mounted to pivot about a horizontal pin 117 connected to the side plate. The bellcrank includes a generally vertical arm 119 whose inner side rigidly supports a lug 120 (FIGS. 18 and 19) which extends into the housing 51 through an opening 121 formed through the side plate 53. The lug is disposed in the path traveled by the adjacent lower follower 86 when the jaws 63 are advanced downwardly and forwardly from the pick-up station 64 to the delivery station 65.

During the final portion of such advance, the lower followers 86 ride along the generally radially extending portions 90 of the lower cam tracks 88 and cause the jaws 63 to move the screw 31 generally radially toward the finder 40. Upon entering the radial portion 90, the follower 86 adjacent the side plate 53 engages the rear side of the lug 120 and then passes under the lug so as to rock the bellcrank 111 clockwise (see FIG. 18), the follower thus acting as a cam. As an incident to such rocking, the ball 116 acts through the screw 115 to raise the lift bar 105 upwardly in the hole 106 and cause the lower finger 104 to bear against and lift the ring 41. As a result, the finder 40 is raised to its retracted position against the bias of the spring 45 and is shifted clear of the advancing screw 31 so that the latter can make its final radial approach to its driving position beneath the finder. As the screw reaches such position, the lower follower 86 moves into the end of the lower cam track 88 and passes from beneath the lug 120 to free the bellcrank 111 for counterclockwise rocking. Accordingly, the spring 45 is able to expand and thus snaps the finder 40 back downwardly to its extended position (see FIG. 19) to cause the end portion of the finder to telescope downwardly over and seat against the screw head while the jaws 63 continue to hold the screw shank. Thus, the momentary retraction of the finder during delivery of the screw enables the screw to be placed beneath the finder while the subsequent extension of the finder enables the finder to telescope over the screw head.

CONTROLLING THE RETURN AND ADVANCE OF THE TRANSFER MECHANISM

Further in accordance with the invention, the normal retract-extend motion undertaken by the finder 40 just before and after driving of the screw 31 is used to advantage to initiate back and forth movement of the jaws 63 between the pick-up and delivery stations 64 and 65. Herein, this is achieved by using the ball 116 as a valve which switches between open and closed states or positions to cause the creation of pneumatic signals for controlling the flow of air through the lines 95 and to the ends of the cylinder 93.

As shown in FIG. 6, the ball 116 is located within a hole 121 formed within and opening out of the upper side of the upper arm 113 of the bellcrank 111. The hole 121 is adapted to communicate with a horizontal passage 123 which is formed in the arm 113 and which communicates with a flexible line 124 by way of a fitting 125. A flow of pressurized air is directed continuously into the line 124.

When the finder 40 is in its normal extended position preparatory to a screw 31 being driven, the ring 41 bears downwardly against the lower finger 104 of the lift bar 105 as shown in FIG. 2 and in phantom in FIG. 6. Thus, the screw 115 on the upper finger 110 presses downwardly against the valve ball 116 to seat the ball against the bottom of the hole 121. The ball thus closes off the passage 123 to prevent any air from escaping out of the line 124.

Figure 15:
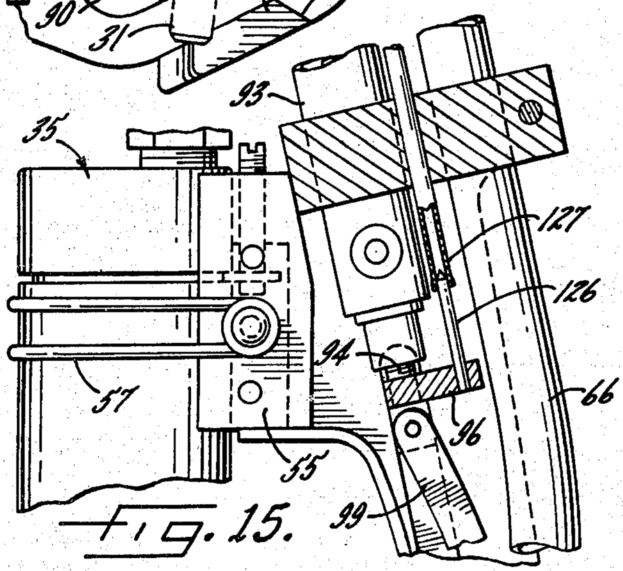
FIG. 15 is an enlarged side elevation of parts which appear in FIG. 2, the parts being shown in a moved position.

As the screw 31 is initially pressed against the workpiece 33, the finder 40 retracts with its normal motion and pulls the ring 41 upwardly away from the lower finger 104 of the lift bar 105 (see FIG. 6). Accordingly, the lift bar no longer is captivated against upward movement and no longer presses against the valve ball 116. Thus, the pressure within the passage 123 forces the ball and the lift bar upwardly and unseats the ball to allow air to escape out of the line 124 through the hole 121. The flow of air through the line results in actuation of a control valve (not shown) which dumps pressure from the upper end of the cylinder 93 and admits pressurized air into the lower end of the cylinder. Accordingly, the rod 94 is retracted and begins shifting the jaws 63 upwardly and rearwardly toward the pickup station 64 immediately upon retraction of the finder. The lower end of the cylinder remains pressurized as long as the finder is in its retracted position and thus the jaws are moved to and held in the pickup station during driving of the screw. As the jaws reach the pick-up station, a probe 126 (see FIGS. 11 and 15) on the block 96 telescopes into and closes off a line 127 which extends into the housing 51 and which also receives a flow of pressurized air. Closure of the end of the line 127 by the probe 126 produces a pneumatic signal which is routed to the feeding and delivery unit 70 to cause another screw 31 to be blown through the tube 66 and into the fingers 74 of the jaws 63 (see FIG. 13).

When the screw 31 being driven has been completely tightened, the gun 35 is lifted away from the screw to enable the finder 40 to spring downwardly to its normal extended position. During the final part of such movement, the ring 41 once again bears against the lower finger 104 (FIGS. 6 and 7) of the lift bar 105 to cause the screw 115 on the upper finger 110 to press the ball 116 downwardly to its closed position in the hole 121. The flow of air through the line 124 thus is interrupted so as to produce a signal causing the cylinder control valve to de-pressurize the lower end of the cylinder 93 and to admit pressurized air into the upper end of the cylinder. Accordingly, the rod 94 is extended to advance the jaws 63 downwardly and forwardly toward the delivery station 65 in order to place the new screw 31 in the finder 40. The upper end of the cylinder remains pressurized to keep the jaws in the delivery station and in holding relation with the screw shank until the screw is pressed against the workpiece 33 to once again effect retraction of the finder and opening of the valve ball 116.

It will be apparent from the foregoing that the normal retraction undertaken by the finder 40 as the screw 31 is first pressed against the workpiece 33 is utilized to initiate return of the jaws 63 to the pick-up station 64 while the subsequent extension of the finder after completion of the driving operation is used to initiate advance of the jaws to the delivery station 65. Importantly, however, the momentary retraction and subsequent extension undertaken by the finder during delivery of the screw does not change the position of the valve ball 116 and thus the advance of the jaws 63 toward the delivery station is not interrupted by such extension and retraction. As the follower 86 engages the lug 120 to rock the bellcrank 111 clockwise and momentarily retract the finder 40, the valve ball 116 presses upwardly against the screw 115 in the upper finger 110 of the lift bar 105 (see FIG. 18). Thus, the ball 116, the screw 115 and the lift bar 105 all move upwardly in unison with the finder 40 and, since the ball and the screw are in pressing engagement, the ball remains in a closed position in the hole 121 to prevent the escape of air from the line 124. Similarly, the ball 116, the screw 115 and the lift bar 105 all move downwardly in unison when the follower 86 moves from beneath the lug 120 to enable the spring 45 to extend the finder 40. The ball thus remains seated in the hole 121 as the finder is returned to its extended position. When the finder is subsequently retracted, however, by pressing against the screw 31, the ring 41 simply moves upwardly away from the lower finger 104 of the lift bar 105. This enables the air pressure in the line 124 to act through the ball 116 and move the lift bar 105 upwardly a short distance relative to the stationary bellcrank 111 so that the ball may open the hole 121 and permit air to bleed from the line. Accordingly, the ring 41 and the lower finger 104 of the lift bar 105 constitute a lost-motion connection which enables the valve ball 116 to remain closed whenever the finder is retracted by the bellcrank 111 and the lift bar but which enables the bellcrank to remain stationary and the ball to open whenever the finder is retracted as a result of the screw 31 being pressed against the workpiece.

OPENING AND CLOSING THE JAWS

In keeping with another feature of the invention, the jaws 63 of the transfer mechanism 50 are biased to and are held in their closed positions in a unique manner which enables the jaws to tightly grip and maintain precise control over the screw 31 during the advance of the screw toward the delivery station 65, to continue to confine and control the screw during initial driving while permitting turning of the screw, and to easily release the screw and move axially along the finder 40 upon being initially returned from the delivery station. Such action is produced by using spring pressure to keep the jaws closed as they are advanced toward the delivery station and by releasing the spring pressure and mechanically clamping the jaws during their final approach into the delivery station.

Figure 12:
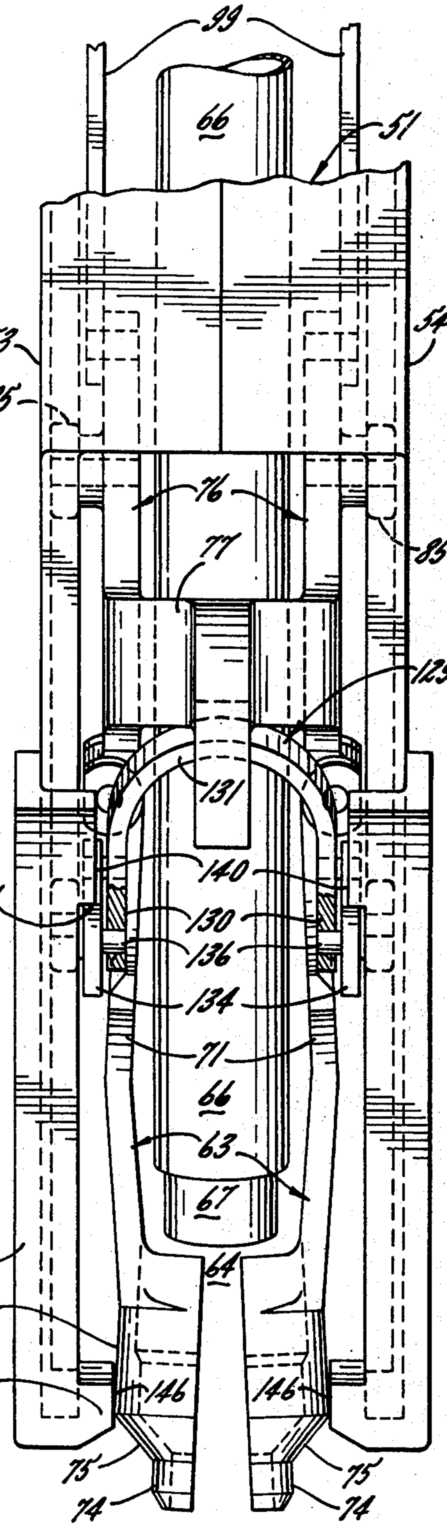
FIG. 12 is an enlarged rear elevation of parts shown in FIG. 11.

More specifically, the spring pressure is applied to the jaws 63 by a so-called horseshoe spring 129 (FIGS. 9, 10 and 12) which comprises a substantially U-shaped strip of spring metal adapted to move into and out of straddling relation with the jaws to apply and release the pressure. The spring 129 is positioned with its legs 130 located generally on the outboard sides of the jaws and with its bridge 131 backed by a tang 133 formed integrally with and depending from the connecting strap 77 of the carrier members 76.

Figure 14:
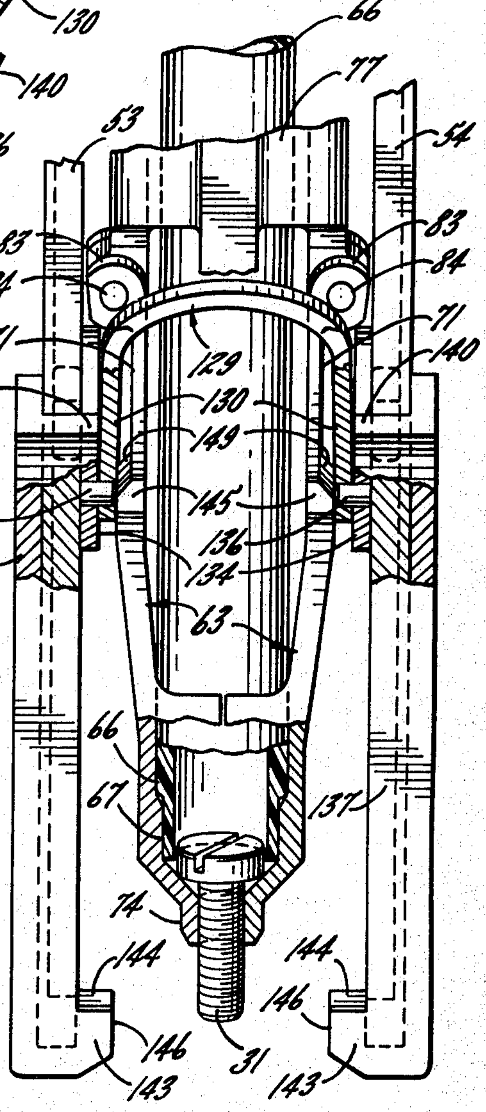
FIG. 14 is a rear elevation of parts shown in FIG. 13.

As shown in FIGS. 9 and 14, two links 134 are pivotally connected by pins 135 to the lower legs 79 of the carrier members 76 and are pivotally connected by pins 136 to the ends of the legs 130 of the spring 129, the links being located between the side plates 53 and 54 and the outboard sides of the spring legs. The spring legs 130 receive the pins 136 with a slip-fit and thus are capable of sliding laterally on the pins and toward and away from the links 134.

The links 134 mount the spring 129 pivotally on the carrier members 76 to swing downwardly and upwardly between an apply position (FIG. 13) in which the spring is operably connected to the jaws 63 and a release position (FIG. 9) in which the spring is disconnected from the jaws. To effect swinging of the spring between such positions, supplementary plates 137 (FIGS. 5 and 6) are bolted to the outer sides of the side plates 53 and 54 adjacent the lower end portions thereof and each includes a bottom lip 139 which underlies the lower edge of the adjacent side plate. For the most part, the inboard edge of each lip 137 is coplanar with the inner side of the adjacent side plate. The upper end of each lip, however, is formed with a lug 140 (see FIGS. 5, 6 and 9) which extends inwardly from the side plate and whose beveled lower edge defines a stop surface 141. In addition, an inwardly extending abutment 143 is formed on the lower end of each lip and includes a beveled upper edge which defines a stop surface 144.

Figure 13:
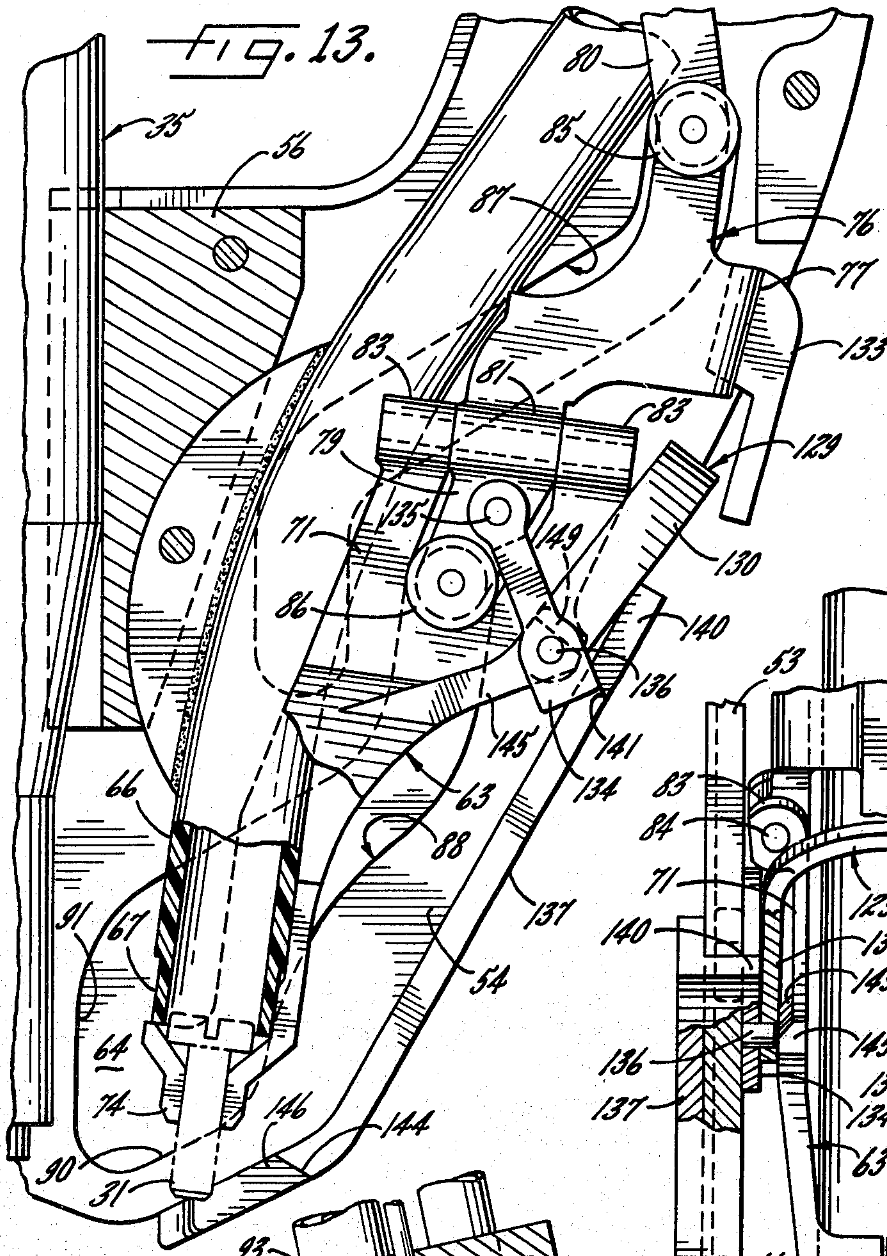
FIG. 13 is an enlarged side elevation of parts shown in FIG. 11 but showing the parts located in the pick-up station and receiving a new screw.

When the jaws 63 are in the pick-up station 64, the spring 129 is located in its apply position shown in FIG. 13 and its legs 130 are in tight engagement with raised flats 145 on the outboard sides of the jaws 63 (see FIG. 14). The raised flats 145 are wedged rather tightly between the spring legs 130 and thus the legs are pressed against the links 134 which, in turn, are pressed against the inboard sides of the side plates 53 and 54. Accordingly, the spring 129 is loaded and exerts inward pressure on the jaws 63 to bias the fingers 74 thereof into the closed position in which the fingers contact one another and define a tubular chuck for receiving the shank of the screw 31. As the screw is blown through the tube 66 and into the jaws (see FIGS. 13 and 14), its shank moves between the fingers and separates the fingers just slightly, the shank thus being tightly gripped by the spring-loaded fingers.

As the jaws 63 are advanced from the pick-up station 64 to the delivery station 65, the spring pressure is maintained on the jaws except during the final approach of the jaws into the delivery station. Thus, the fingers 74 tightly grip the shank of the screw 31 and provide good control of the screw during its rapid advance toward the delivery station. Because of the tight grip, such good control is maintained even if the gun 35 is in an inclined or horizontal position.

Figure 19:
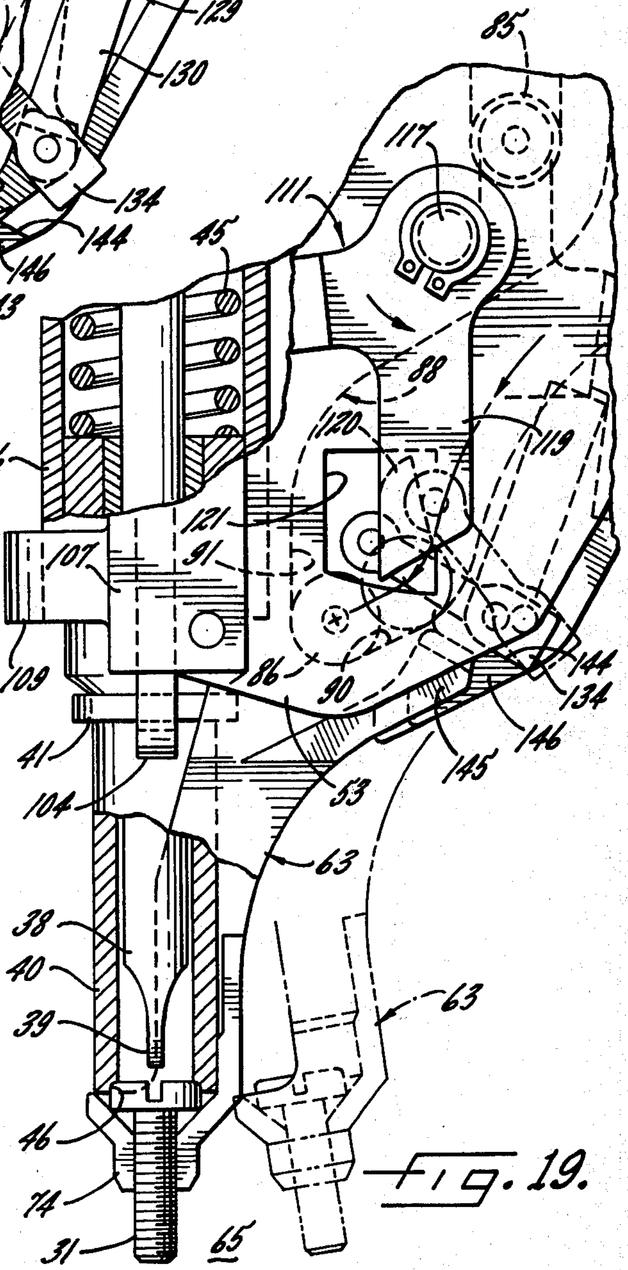

During the final approach of the screw 31 into the delivery station 65, the lower ends of the links 134 engage and are stopped by the stop surfaces 144 of the abutments 143 on the lips 139 (see FIG. 19). Such stopping causes the links and the spring 129 to pivot counterclockwise about the pins 135 as the jaws 63 continue their advance, the spring thus being moved to its release position with respect to the jaws. With the spring 129 stopped and with continued advance of the jaws, the raised flats 145 on the jaws move out from between the spring legs 130 and thus the spring is disconnected from the jaws and is no longer effective to urge the jaws to their closed position. Just before the raised flats 145 move out from between the spring, however, they move between and are mechanically clamped by the inboard sides 146 of the abutments 143 on the lower ends of the lips 139 (see FIG. 5). Hence, the abutments keep the jaws in their closed position while the screw 31 makes its final approach to the delivery station 65 and is placed in the finder 40. The fingers 74 thus confine the screw shank and hold the screw in the finder until such time as the operator starts to drive the screw.

When the operator presses the screw 31 against the workpiece 33 and the finder 40 retracts to initiate return of the jaws 63 out of the delivery station 65, the lower followers 86 move upwardly along the axial portions 91 of the lower cam tracks 88 and cause the jaw fingers 74 to move upwardly or axially along the screw shank. The fingers do not grip the screw shank quite so tightly when the jaws 63 are clamped by the abutments 143 as when the jaws are held closed by the spring 129. Accordingly, the fingers may slide upwardly along the shank and the screw may rotate within the fingers as the fingers initially retract and as the blade 39 begins driving the screw. The upwardly retracting fingers 74 continue to confine the shank as the first one or two threads of the screw are driven into the workpiece and thus the fingers maintain control over the screw until it is started and is capable of being controlled solely by the finder 40.

As the fingers 74 begin moving upwardly along the shank of the screw 31, the raised flats 145 on the jaws 63 being moving upwardly from between the abutments 143 (see FIG. 9). As soon as the flats clear the abutments, the jaws are no longer clamped and, since the spring 129 is still in its release position, the jaws are free to swing to their open position and release the fingers 74 from the screw (see FIG. 10). Such swinging occurs as the half cones 75 first cam against the end of the finder 40. Once open, the jaws 63 remain in their open position as the fingers 74 first retract upwardly along the finder and then are pulled rearwardly away from the finder along a path substantially as indicated by the line 147 in FIG. 11.

The jaws 63 stay open until they make their final approach back into the pick-up station 64. As this time, the ends of the links 134 engage the stop surfaces 141 on the lugs 140 to cause the spring 129 to pivot downwardly to and stop in its apply position as the jaws complete their final movement (see FIG. 13). During such movement, cam surfaces 149 (FIGS. 9 and 13) on the ends of the raised flats 145 engage the spring legs 130 and close the jaws 63 while simultaneously spreading the legs so that the flats may move between the legs and place the jaws under spring pressure. Accordingly, the spring is operably re-connected to the jaws as the jaws complete their final movement into the pick-up station 64.

A SUMMARY OF OPERATION OF THE GUN AND THE TRANSFER MECHANISM

With the exception of the feeding and delivery unit 70, all of the basic elements of the machine 30 have now been described. The following summary of operation has been presented in order to explain an overall cycle of the machine. At the beginning of each cycle, the jaws 63 are clamped closed in the delivery station 65 by the inboard sides 146 of the abutments 143 and hold a screw 31 in telescoping relation with the finder 40 (see FIGS. 2 and 5). As the first step in the cycle, the operator manipulates the gun 35 to press the screw against the workpiece 33. As the gun then is moved downwardly, the finder begins retracting as shown in FIGS. 6 and 7. Just as the finder reaches its retracted position, the blade 39 presses against the screw head and starts rotating so as to initiate driving of the screw.

Movement of the finder 40 toward its retracted position shifts the ring 41 upwardly away from the lower finger 104 of the lift bar 105 (see FIGS. 6 and 7) and frees the lift bar and the valve ball 116 for upward movement. Accordingly, the air pressure in the passage 123 unseats the ball from the hole 121 and allows air to escape from the line 124. This causes the rod 94 to retract and begin returning the jaws 63 upwardly and rearwardly to the pick-up station 64.

During the first part of the return, the lower followers 86 ride along the vertically extending portions 91 of the lower cam tracks 88 (see FIG. 9) and cause the fingers 74 of the jaws 63 to slide upwardly or axially along the shank of the screw 31. The fingers thus continue to hold the screw in the finder 40 and maintain control over the screw until the screw has been started into the workpiece 33.

Figure 10:
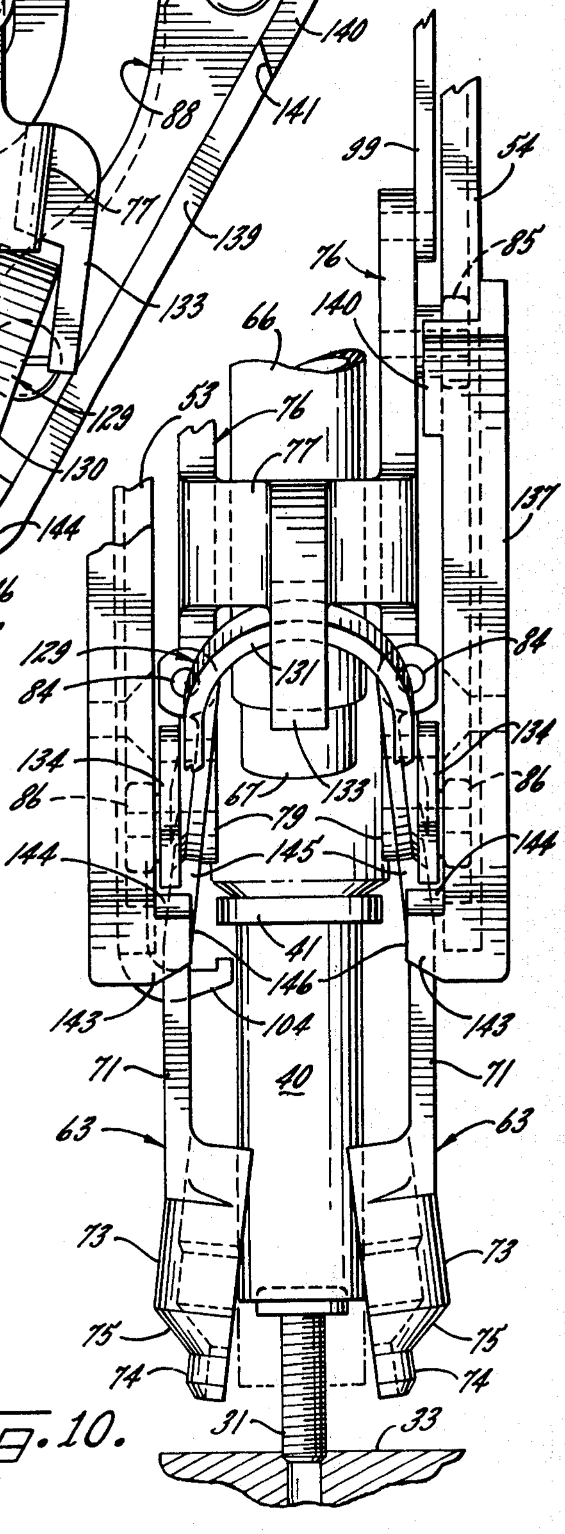
FIG. 10 is a rear elevation of parts shown in FIG. 9.

As the jaws 63 continue their upward travel, the raised flats 145 move upwardly from between the abutments 143 and free the jaws to swing to their open position as the half-cones 75 of the jaws cam against the screw head and the lower end of the finder 40 (see FIGS. 9 and 10). Thus, the fingers 74 open to release the screw and to move clear of the finder 40.

Upon opening of the fingers 74, the jaws 63 begin moving rearwardly away from the finder 40 along the path 147 (FIG. 11) while continuing their upward movement as the lower followers 86 ride along the upwardly and rearwardly inclined portions of the lower cam tracks 88. The jaws then move upwardly into the pick-up station 64. As the jaws approach the pick-up station, the links 134 engage and stop against the lugs 140 (see FIG. 11) to prevent further upward movement of the spring 129. During the final return movement of the jaws, the raised flats 145 move between the legs 130 of the spring 129 as shown in FIGS. 13 and 14 to operably connect the spring to the jaws 63. The jaws thus are baised to their closed position.

Final movement of the jaws 63 into the pick-up station 64 causes the probe 126 (FIG. 15) to move into and close off the line 127 and produce a signal for the feeding and delivery unit 70 to blow another screw 31 through the tube 66. The screw thus shoots through the tube and lodges between the fingers 74 of the closed jaws (see FIGS. 13 and 14).

Figure 11:
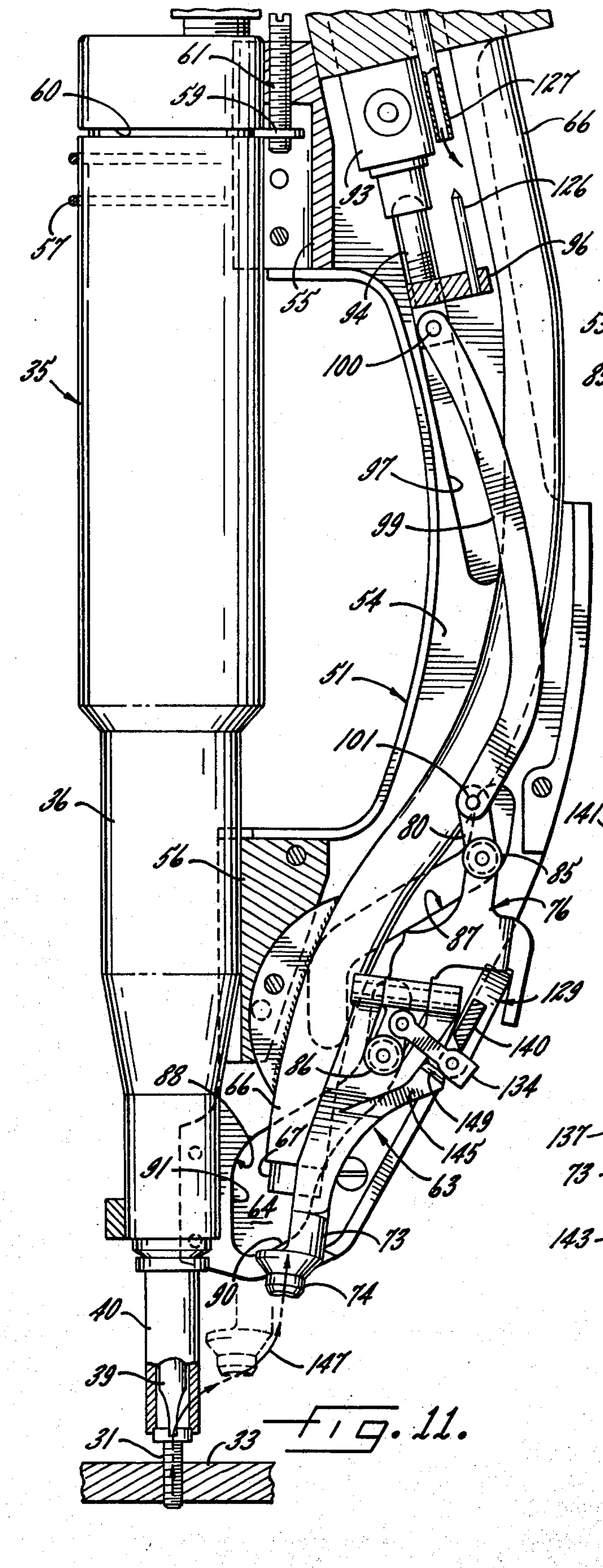
FIG. 11 is a view somewhat similar to FIG. 2 but on an enlarged scale and showing the parts as the transfer mechanism returns to the pick-up station to receive a new screw.

The entire return movement of the jaws 63 from the delivery station 65 to the pick-up station 64 occurs at great speed and takes place during the time the first screw 31 is being driven into the workpiece 33 (see FIG. 11). Accordingly, a new screw most usually will be placed between the jaws 63 in the pick-up station 64 before the first screw has been completely driven. A certain amount of time, however, is required for the new screw to be blown through the tube 66 and into the jaws 63 from the instant the probe 126 first closes off the line 127. To insure that the jaws will not re-advance toward the delivery station 65 before the required "blow" time has elapsed, a pneumatic timer (not shown) is set by the signal which is created when the probe 126 closes off the line 127. The timer automatically times out after the elapse of a predetermined time interval greater than the maximum required "blow" time and, until the timer times out, the cylinder 93 is disabled and cannot advance the jaws toward the delivery station 65 even if an "advance" signal is being produced in the line 124. Thus, the jaws are prevented from advancing back to the delivery station until sufficient time has elapsed for the new screw to blow through the tube and into the jaws.

After the first screw 31 has been driven home, the operator lifts the gun 35 from the screw and, as an incident thereto, the spring 45 forces the finder 40 to its extended position (see FIG. 16). The ring 41 engages the lower finger 104 of the lift bar 105 (FIGS. 16 and 17) and shifts the lift bar downwardly to cause the screw 115 on the upper finger 110 to press the valve ball 116 downwardly into seating engagement with the bottom of the hole 121. With air no longer escaping from the line 124, the advance signal is produced and, assuming that the pneumatic timer has timed out, the rod 94 of the cylinder 93 is extended to start advancing the jaws 63 and the new screw from the pick-up station 64 to the delivery station 65. During the major portion of such advance, the spring 129 keeps the jaw fingers 74 tightly biased around the screw shank so as to maintain good control over the screw and to prevent the screw from bouncing. Also, the lower followers 86 ride along the lower edges of the lower cam tracks 88 during the advance so that the screw will make a generally radial final approach into the delivery station 65.

Just as the lower followers 86 begin to enter the radial portions 90 of the lower cam tracks 88, one of the followers engages the lug 120 (see FIG. 18) and pivots the bellcrank 111 clockwise. The lift bar 105 thus is raised upwardly and momentarily lifts the finder 40 to its retracted position to enable the screw 40 to be placed beneath and in line with the finder. While the finder is lifted, the links 134 engage and stop against the stop surfaces 144 of the abutments 143 (see FIG. 19) and prevent further movement of the spring 129. As the jaws 63 continue their advance, the raised flats 145 move out from between the spring legs 130 and move between the inboard surfaces 146 of the abutments 143. The spring force thus is removed from the jaws 63 so that the jaws may open freely when subsequently returned toward the pick-up station 64. The abutments, however, continue to hold the jaws in their closed position during their final advance into the delivery station 65.

As the jaws 63 make their final advance, the lower follower 86 moves past the lug 120 (see FIG. 19) to free the bellcrank 111 for counterclockwise pivoting and to free the lift bar 105 for downward movement. At this time, ths spring 45 expands and forces the finder 40 downwardly to its extended position and into telescoping relation with the head of the newly delivered screw 31 (see FIGS. 2 and 19). This completes one operating cycle, and the finder 40 and the jaws 63 continue to hold the newly delivered screw until such time as the operator initiates the next cycle by pressing the screw against the workpiece 33.

A typical operating cycle requires only about 1½ seconds to complete. The cycle time will, of course, vary depending upon the length of the screw 31, the pitch of the screw threads, the rotational speed of the bit 38, and the reaction time required for the operator to lift the gun 35 upwardly after driving the screw home. Once the gun has been lifted, a new screw is delivered to the finder 40 almost immediately and usually is in place in the finder before the operator can position the gun over the next hole in the workpiece 33. Accordingly, screws can be driven at a rapid rate. The high speed operation of the machine 30 is further enhanced by the fact that the screw is placed into the lower end of the finder 40 rather than through an opening in the side of the finder as is the case with many machines. With the screw being placed into the end of the finder, the vertical spacing between the screw head and the blade 39 may be reduced so as to enable the blade to press against the head and begin rotating after the finder 40 has been retracted through only a very short stroke. The short stroke of the finder also enables better control of the screw by the finder and the blade during the critical period of initial threading. Thus, even relatively short screws may be driven and the gun may be disposed at any orientation without losing control over any significant number of screws.

THE FEEDING AND DELIVERY UNIT

The unit 70 for feeding the screws 31 into and blowing the screws through the tube 66 is shown in FIG. 1 and in FIGS. 20 to 23 and comprises a housing 160 which supports a power-rotated hopper 161 adapted to store a large supply of screws. Upon leaving the hopper, the screws proceed one-by-one to the end of a downwardly inclined track 163 where a positioning mechanism 164 picks up the leading screw and transfers the screw away from the track for subsequent placement into the tube 66. The tube is supported by the housing and leads to the gun 35 through an opening 162 in the housing. Between the unit 70 and the gun 35, a suspension device (not shown) supports the tube 66 and the various lines 47, 95, 124 and 127, the lines leading to a pneumatic control unit (not shown) adjacent the housing 160.

The positioning mechanism 164 is generally similar to that disclosed in my copending application Ser. No. 464,627, filed Apr. 26, 1974, and includes a pair of fingers 165 (FIGS. 21 and 22) which close upon and grip the leading screw in the track when the fingers are positioned adjacent the end of the track as shown in FIG. 21. The fingers and the gripped screw thereafter are moved first outwardly along a path in line with the track and then upwardly along a right angled path to a position (see FIGS. 20 and 22) in line with and above the inlet end of the tube. After being opened to release the screw, the fingers are returned reversely to the track 163 to pick up the next screw.

The mechanism for moving the fingers 165 back and forth and for effecting the opening and closing movement of the fingers is explained fully in the aforementioned application and need not be here described in detail. Briefly, such movements are produced in response to back and forth rocking of a linkage 166 (FIGS. 20 and 21) which is operably connected to the fingers 165 and which is secured to a rockshaft 167. The latter is rotatably supported by the housing 160 and is turned back and forth as the rod 169 of a pneumatic cylinder 170 is extended and retracted, the cylinder being fastened to the housing.

In accordance with another feature of the invention, the fingers deliver the screw 31 to a head 171 (FIGS. 20 to 23) which subsequently places the screw in the tube 66 and closes off the end of the tube to enable the screw to be blown through the tube by pressurized air introduced into the tube through the head. The head is mounted to move from a first position (FIGS 20 and 22) in which the head receives the screw from the fingers 165 and a second position (FIGS. 21 and 23) in which the head places the screw in the tube. In moving between its positions, the head travels along a path whose upper portion coincides with the path followed by the fingers 165 as the fingers move through the end of their advance stroke and then move reversely through the first part of their return stroke.

Figure 22:
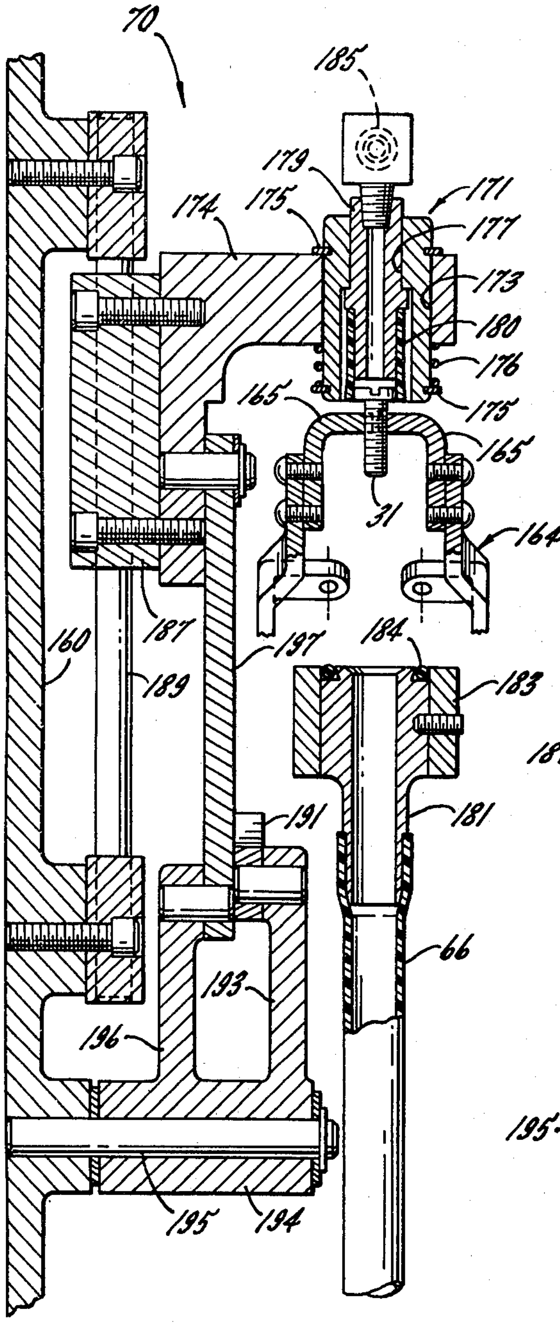
FIG. 22 is an enlarged fragmentary cross-section taken substantially along the line 22—22 of FIG. 20.

As shown in FIG. 22, the head 171 comprises a cylindrical member which is mounted for limited up and down sliding within a hole 173 in a bracket 174, the head being retained in the hole by upper and lower snap rings 175. A coil spring 176 is telescoped over the head and is compressed between the underside of the bracket and the lower snap ring to urge the head downwardly while permitting the head to slide upwardly within the hole 173.

Formed through the head 171 is an axially extending bore 177 (FIG. 22) within which a tubular fitting 179 is rigidly secured. A part-holding device in the form of a resiliently yieldable sleeve 180 made of rubber, plastic or the like is telescoped into the bore and is telescoped over the lower end portion of the fitting, the lower end portion of the sleeve extending downwardly beyond the end of the fitting. When the head 171 is in its upper position shown in FIG. 22, the fingers 165 place the head of the screw 31 into the lower end portion of the sleeve 180 as the fingers move away from the track 163 and reach the end of their advance stroke. The sleeve 180 is sized to resiliently grip the screw head and thus holds the screw after the fingers 165 are opened and are retracted from beneath the head.

Figure 23:
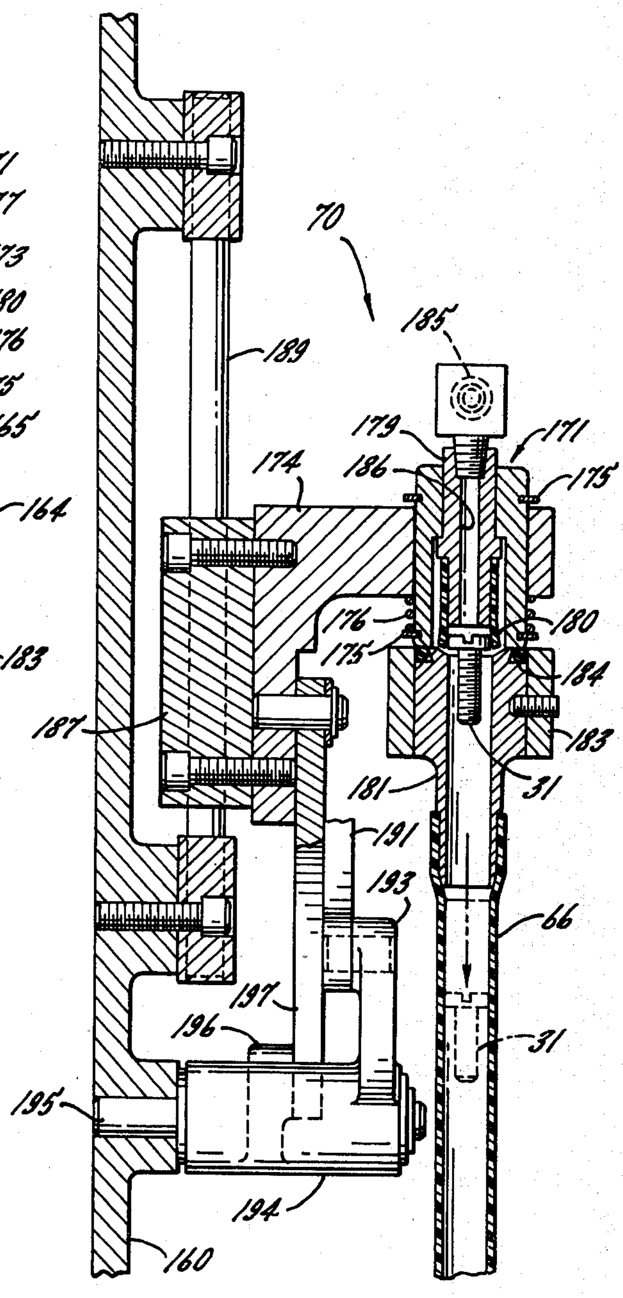
FIG. 23 is an enlarged fragmentary cross-section taken substantially along the line 23—23 of FIG. 21.

As the fingers 165 retract, the bracket 174 is moved downwardly to shift the head 171 and the gripped screw 31 toward the screw-receiving end of the tube 66. A rigid tubular extension 181 (FIG. 22) is telescoped into the tube and is anchored to the housing 160 by a bracket 183. As the head 171 moves downwardly, its lower end engages and seals against an O-ring 184 located on the upper end of the extension 181, the head thus sealing off the upper end of the tube as shown in FIG. 23. At the same time, the sleeve 180 places the screw 31 into the extension 181. Thereafter, pressurized air is delivered through a line 185 (FIG. 20) and into a passage 186 (FIG. 23) which extends through the fitting 179. The air forces the screw out of the resilient sleeve 180 and shoots the screw through the tube 66 (see the phantom illustration in FIG. 23) with high velocity and into the waiting jaws 63 at the pick-up station 64. The inside diameter of the tube corresponds closely to the diameter of the screw head and thus the pressurized air can easily blow the screw through the tube. Because the tube is made of flexible plastic, the screw is not likely to become jammed in the tube. If the screw head is slightly oversize or is formed with a protruding burr, the plastic will yield to allow the screw to pass through the tube. If the screw should happen to jam, the spring 176 on the head 171 will yield as air pressure builds up in the tube and will allow the head to move upwardly within the hole 173 and away from the tube extension 181 to relieve the pressure. Thus, the spring 176 prevents the air pressure from building up to such a high value as to blow the screw violently through the tube and cause possible injury to the operator.

Figure 20:
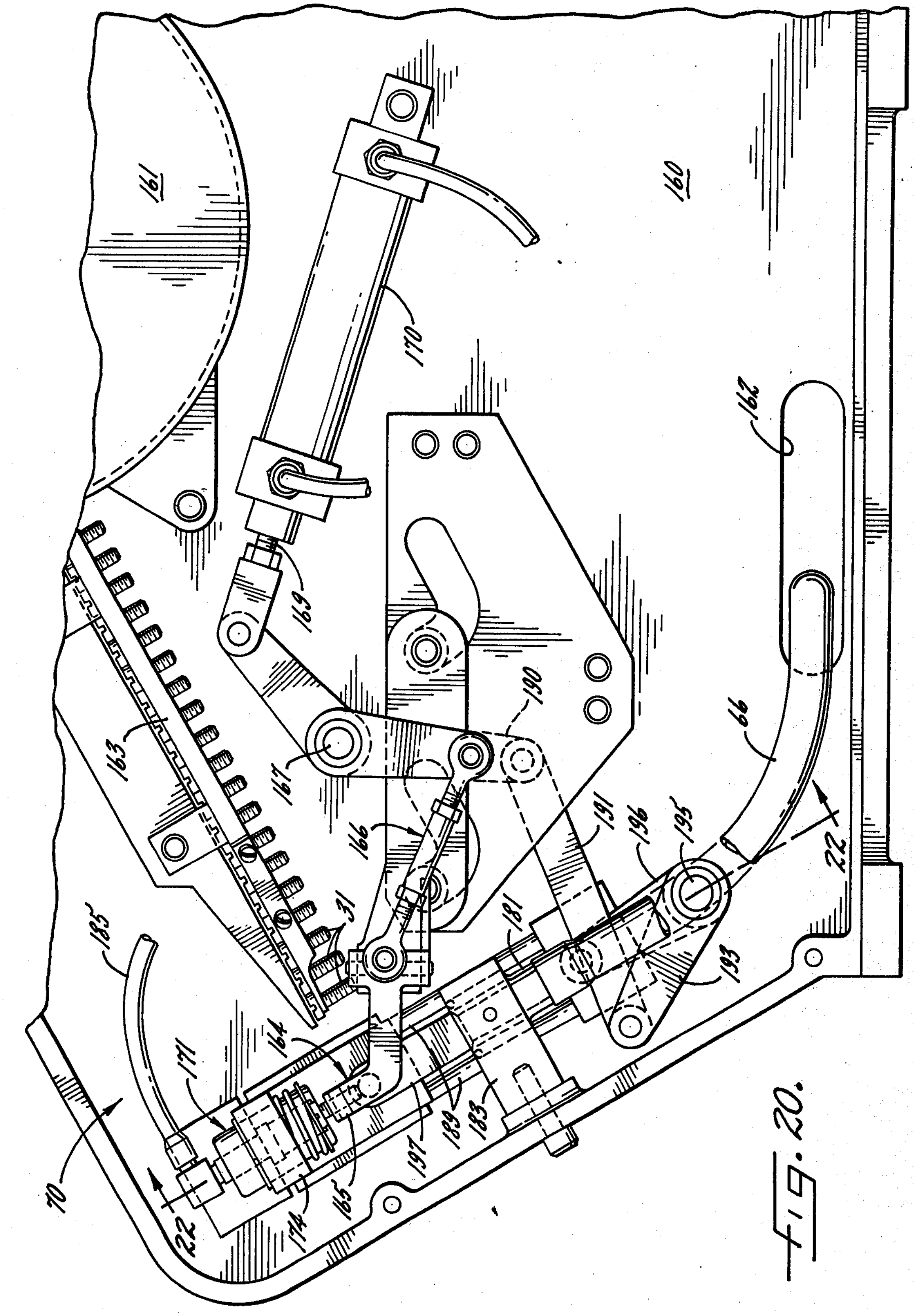
FIG. 20 is an enlarged elevational view of parts of the screw feeding and delivery unit shown in FIG. 1.
Figure 21:
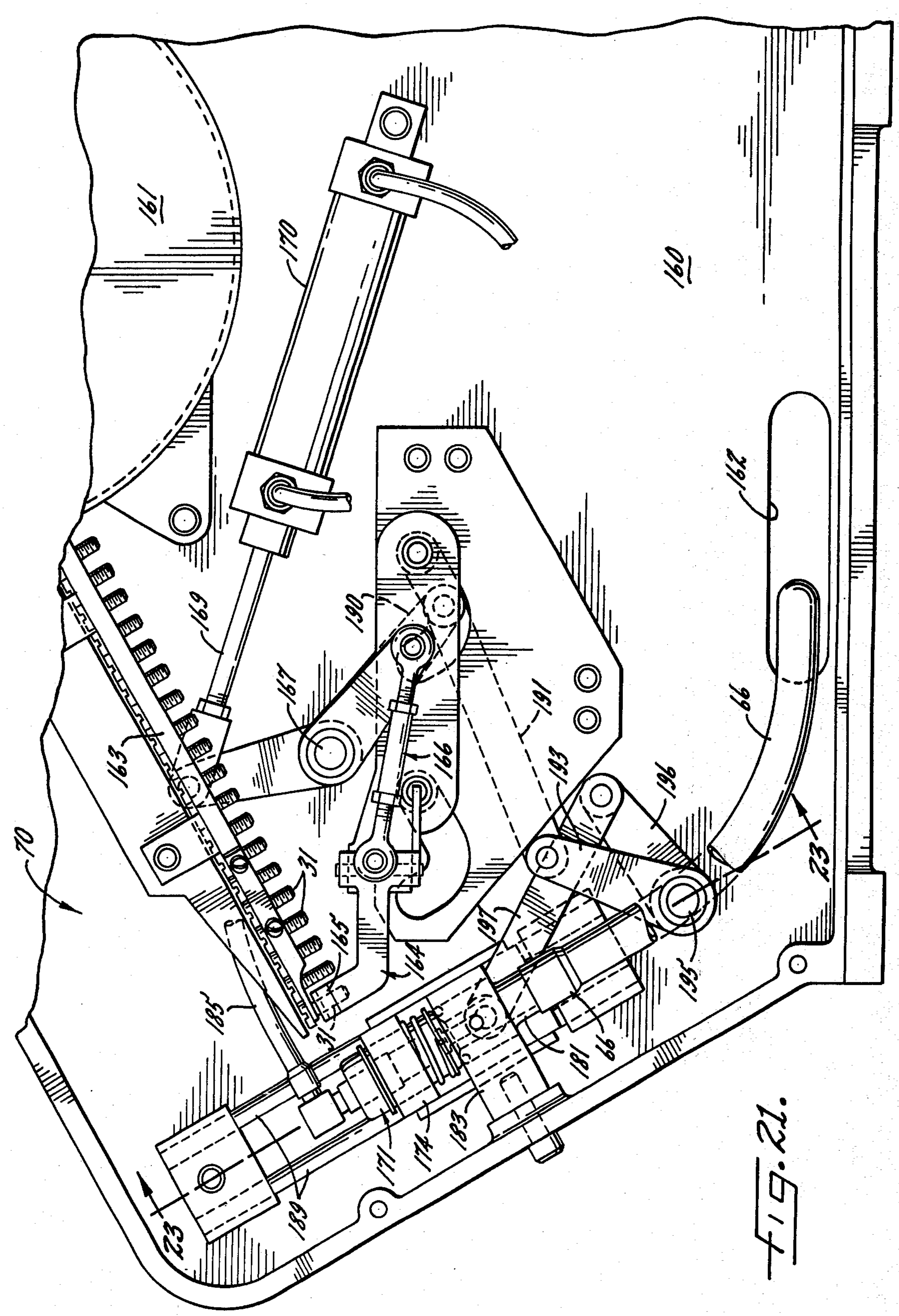
FIG. 21 is a view similar to FIG. 20 but shows certain parts in moved positions.

After the screw 31 has been blown through the tube 66, the bracket 174 is shifted upwardly to retract the head 171 away from the extension 181 to the position shown in FIGS. 20 and 22. Thereafter, the fingers 165 place a new screw in the sleeve 180 preparatory to the next cycle.

To support the head 171 for up and down shifting, the bracket 174 is connected to a block 187 (FIG. 22) which, in turn, is mounted for up and down sliding on a pair of guide rods 189 secured to the housing 160. Shifting of the head is effected in response to actuation of the cylinder 170 and, for this purpose, a link 190 (FIG. 20 is secured rigidly to the rockshaft 167 and is pivotally connected to a second link 191 which extends toward the guide rods 189. The link 191 is pivotally connected to an arm 193 projecting radially from a hub 194 (FIG. 22) which is mounted to oscillate back and forth on a pin 195 extending from the housing 160. A second radially projecting arm 196 also is rigid with the hub and is pivotally connected to one end of a link 197 whose other end is pivotally connected to the bracket 174. When the rod 169 is extended to turn the rockshaft 167 counterclockwise and retract the fingers 165 away from the head 171, the links 190 and 191 and the arm 193 rock the hub 194 in a clockwise direction. The arm 196 and the link 197 thus shift the head 171 downwardly. The head and the fingers 165 move downwardly in unison for a short distance and then the fingers move at right angles to the head and toward the track 163 so as to move clear of the head.

When the rod 169 is retracted, the head 171 starts moving upwardly and the fingers 165 start moving outwardly away from the track 163. As soon as the head has cleared the fingers, the latter start moving upwardly and place the screw 31 in the sleeve 180. The linkage 166 is such that the fingers 165 accelerate with respect to the head 171 during the time both the fingers and the head are moving upwardly. Thus, the fingers "catch up" with the head so as to enable the screw to be placed in the sleeve 180 by the time the head and the fingers reach the ends of their strokes.

The following describes the operation of the feeding and delivery unit 70 with respect to the operation of the gun 35. At the start of a cycle, the head 171 is disposed in its upwardly retracted position and the fingers 165 are holding a screw 31 in the sleeve 180 (see FIGS. 20 and 22). When the finder 40 retracts upon pressing its screw against the workpiece 33, the signal which is produced in the line 124 to effect return of the jaws 63 is also used to initiate extension of the rod 169 of the cylinder 170. Accordingly, the fingers 165 retract while the head 171 moves downwardly and seals off the extension 181 of the tube 66 (see FIGS. 21 and 23).

When the jaws 63 return to the pick-up station 64 and the probe 126 closes off the line 127, the resulting signal in the line sets the pneumatic timer and simultaneously causes pressurized air to be delivered into the line 185. Thus, the screw 31 in the sleeve 180 is blown out of the sleeve and through the tube for delivery into the waiting jaws 63. After sufficient blow time has elapsed, the pneumatic timer times out to shut off the flow of air through the line 185. Then, when the signal is produced in the line 124 to effect advance of the jaws 63, the rod 169 of the cylinder 170 is caused to retract. This results in upward retraction of the head 171 and simultaneous advancement of the fingers 165 so as to place a new screw in the sleeve 180.

AN ALTERNATE FEEDING AND DELIVERY UNIT

Parts of a modified machine are shown in FIGS. 24 to 26 wherein elements corresponding to the elements of the machine 30 are indicated by the same but primed reference numerals. The machine includes a feeding and delivery unit 70' which is characterized by the ability to deliver screws 31' of such a size that the screws might tumble end-for-end within the tube 66' and be blown head-first into the jaws 63'. Such tumbling is prevented by blowing the screw through the tube while the screw is captivated in a holding device or cartridge 210. After releasing the screw at the pick-up station 64', the cartridge is returned reversely through the tube by vacuum.

More specifically, the cartridge 210 comprises an elongated tubular element made of resiliently yieldable material and having an enlarged upper end 211 whose outside diameter corresponds closely to the inside diameter of the tube 66'. When the head 171' is in its upper retracted position, the cartridge 210 is disposed within a bore 213 (FIG. 24) in the fitting 179' and is held releasably in the bore by a resiliently yieldable element such as an O-ring 214. While the cartridge is so positioned, the fingers of the transfer mechanism place the screw into the open lower end of the cartridge, the screw head being gripped by the resilient material.

When the head 171' is lowered, the cartridge 210 and the gripped screw 31' are positioned as shown in FIG. 26 so that the cartridge is located just above the extension 181' of the tube 66'. As pressurized air is delivered into the passage 186', the cartridge is blown out of the bore 213 and shoots into the tube 66' so as to carry the screw through the tube to the pick-up station 64'. The length of the cartridge relative to the inside diameter of the tube is such that the cartridge cannot tumble within the tube and thus the screw is delivered shank-first to the pick-up station.

When the cartridge 210 arrives at the pick-up station 64' (see FIG. 26), its lower end strikes the upper sides of the jaw fingers 74' and is abruptly stopped. The screw 31', however, continues to move by virtue of its momentum. Accordingly, the screw flys out of the grip of the cartridge and lodges between the jaw fingers 74'. As the pneumatic timer times out, vacuum is drawn through the line 185', the passage 186' and the tube 66' to suck the cartridge 210 reversely through the tube and to return the cartridge to the bore 213 before the head 171' is retracted upwardly to enable another screw to be placed in the cartridge.

I claim as my invention:

1. Apparatus for delivering a part to an automatic part driving machine, said apparatus comprising a tube leading to said machine and having an open part-receiving end, a member having a part-holding device, said member being mounted for movement between a first position in which said holding device is spaced from the end of said tube and a second position in which said holding device is contiguous the end of said tube, said member establishing a substantially air-tight seal at the end of said tube when in said second position said member including a bore which is alined with said tube in all positions of said member, said holding device comprising a resiliently yieldable sleeve telescoped into and secured within said bore and adapted to telescope over and resiliently grip a part, mechanism for placing a part in said sleeve when said member is in said first position, means for moving said member to said second position after a part has been placed in said sleeve, and means for thereafter delivering pressurized air into said member to blow said part out of said sleeve and into and through said tube for delivery to the part driving machine.

2. Apparatus as defined in claim 1 further including means resiliently urging said member toward said second position whereby said member may automatically move away from said second position and open said tube if excessive air pressure builds up in said tube.

3. Apparatus for delivering a part to an automatic part driving machine, said apparatus comprising a tube leading to said machine and having an open part-receiving end, said tube further having a delivery end, a member having a part-holding cartridge releasably secured to said member, said cartridge having a portion whose outside diameter approximates but is slightly less than the inside diameter of said tube, said member being mounted for movement between a first position in which said cartridge is spaced from the part-receiving end of said tube and a second position in which said cartridge is contiguous the end of said tube, said member establishing a substantially airtight seal at the end of said tube when in said second position, a mechanism for placing a part in said cartridge when said member is in said first position, means for moving said member to said second position after a part has been placed in said cartridge, means for thereafter delivering pressurized air into said member to blow said cartridge and said part away from said member and into said tube, means adjacent the delivery end of said tube for stopping said cartridge within said tube while permitting said part to move out of the delivery end of the tube, and means for thereafter sucking said cartridge reversely through said tube and back to said member.

4. Apparatus as defined in claim 3 in which said member includes a bore which is alined with said tube in all positions of said member, a resiliently yieldable element telescoped into and secured within said bore and adapted to telescope over and resiliently grip said cartridge, said cartridge comprising a tubular element adapted to telescope over and resiliently grip said part.

* * * * *